(12) United States Patent
Ong

(10) Patent No.: US 8,027,006 B2
(45) Date of Patent: Sep. 27, 2011

(54) LARGE PIXEL MULTI-DOMAIN VERTICAL ALIGNMENT LIQUID CRYSTAL DISPLAY USING FRINGE FIELDS

(75) Inventor: Hiap L. Ong, Diamond Bar, CA (US)

(73) Assignees: Hiap L. Ong (TW); Kyoritsu Optronics Inc., Ltd. (TW)

(*) Notice: Subject to any disclaimer, the term of this patent is extended or adjusted under 35 U.S.C. 154(b) by 0 days.

(21) Appl. No.: 12/493,039

(22) Filed: Jun. 26, 2009

(65) Prior Publication Data
US 2009/0262272 A1 Oct. 22, 2009

Related U.S. Application Data

(62) Division of application No. 11/227,595, filed on Sep. 15, 2005, now Pat. No. 7,630,033.

(51) Int. Cl.
*G02F 1/1343* (2006.01)
(52) U.S. Cl. ............ 349/143; 349/37; 349/108; 349/48
(58) Field of Classification Search .................. 349/106, 349/129, 42, 144, 139, 143, 37, 108, 48; 345/87–89, 92, 103, 694, 96
See application file for complete search history.

(56) References Cited

U.S. PATENT DOCUMENTS

| | | | | |
|---|---|---|---|---|
| 7,042,437 B2 * | 5/2006 | Tai et al. | ........................ | 345/103 |
| 2005/0083277 A1 * | 4/2005 | Credelle | ........................ | 345/87 |

* cited by examiner

*Primary Examiner* — Thoi Duong
(74) *Attorney, Agent, or Firm* — Silicon Valley Patent Group, LLP; Edward S. Mao

(57) ABSTRACT

A multi-domain vertical alignment liquid crystal display that does not require physical features on the substrate (such as protrusions and ITO slits) is disclosed. Each pixel of the MVALCD is subdivided into color components, which are further divided into color dots. The polarity of the color dots are arranged so that fringe fields from adjacent color dots causes multiple liquid crystal domains in each color dot. Specifically, the color dots of a pixel are arranged so that each color dot of a first polarity has four neighboring pixels of a second polarity. Thus, a checkerboard pattern of polarities is formed. Furthermore, the checkerboard pattern is extended across multiple pixels in the MVALCD. In addition, many display unit include multiple pixel designs to improve color distribution or electrical distribution.

18 Claims, 29 Drawing Sheets

FIG. 5(a)

|        | CD_3_2 − |        |
|--------|----------|--------|
| CD_3_1 − | CD_2_2 + | CD_3_3 − |
| CD_2_1 + | CD_1_2 − | CD_2_3 + |
| CD_1_1 − |          | CD_1_3 − |

|        | CD_3_2 + |        |
|--------|----------|--------|
| CD_3_1 + | CD_2_2 − | CD_3_3 + |
| CD_2_1 − | CD_1_2 + | CD_2_3 − |
| CD_1_1 + |          | CD_1_3 + |

|  | CD_3_2 + |  | CD_3_4 + |
|---|---|---|---|
| CD_3_1 + | CD_2_2 − | CD_3_3 + | CD_2_4 − |
| CD_2_1 − | CD_1_2 + | CD_2_3 − | CD_1_4 + |
| CD_1_1 + |  | CD_1_3 + |  |

|  | CD_3_2 − |  | CD_3_4 − |
|---|---|---|---|
| CD_3_1 − | CD_2_2 + | CD_3_3 − | CD_2_4 + |
| CD_2_1 + | CD_1_2 − | CD_2_3 + | CD_1_4 − |
| CD_1_1 − |  | CD_1_3 − |  |

| CD_3_1 + | | CD_3_3 + | |
|---|---|---|---|
| CD_2_1 − | CD_3_2 + | CD_2_3 − | CD_3_4 + |
| CD_1_1 + | CD_2_2 − | CD_1_3 + | CD_2_4 − |
| CD_1_2 + | | CD_1_4 + | |

| CD_3_1 − | | CD_3_3 − | |
|---|---|---|---|
| CD_2_1 + | CD_3_2 − | CD_2_3 + | CD_3_4 − |
| CD_1_1 − | CD_2_2 + | CD_1_3 − | CD_2_4 + |
| CD_1_2 − | | CD_1_4 − | |

| | CD_3_4 + | |
|---|---|---|
| CD_3_2 + | CD_2_4 − | CD_3_6 + |
| CD_2_2 − | CD_1_4 + | CD_2_6 − |
| CD_1_2 + | CD_3_3 − | CD_1_6 + |
| CD_3_1 − | CD_2_3 + | CD_3_5 − |
| CD_2_1 + | CD_1_3 − | CD_2_5 + |
| CD_1_1 − | | CD_1_5 − |

| | CD_3_4 − | |
|---|---|---|
| CD_3_2 − | CD_2_4 + | CD_3_6 − |
| CD_2_2 + | CD_1_4 − | CD_2_6 + |
| CD_1_2 − | CD_3_3 + | CD_1_6 − |
| CD_3_1 + | CD_2_3 − | CD_3_5 + |
| CD_2_1 − | CD_1_3 + | CD_2_5 − |
| CD_1_1 + | | CD_1_5 + |

| CD_1_1 + | CD_2_1 − | CD_3_1 + | CD_4_1 − | CD_3_2 + | CD_4_2 − |
| | CD_1_2 + | CD_2_2 − | CD_3_2 + | | |

| CD_1_1 − | CD_2_1 − | CD_3_1 + | CD_4_1 − |
| CD_4_2 − | CD_1_2 + | CD_2_2 − | CD_3_2 + |
| CD_1_3 + | CD_2_3 − | CD_3_3 + | CD_4_3 − |
| CD_4_4 − | CD_1_4 + | CD_2_4 − | CD_3_4 + |

| CD_1_1 − | CD_2_1 + | CD_3_1 − | CD_4_1 + |
| CD_4_2 + | CD_1_2 − | CD_2_2 + | CD_3_2 − |
| CD_1_3 − | CD_2_3 + | CD_3_3 − | CD_4_3 + |
| CD_4_4 + | CD_1_4 − | CD_2_4 + | CD_3_4 − |

1010

| CD_1_1 + | CD_2_1 − | CD_1_2 + | CD_2_2 − |
|---|---|---|---|
| CD_4_1 − | CD_3_1 + | CD_4_2 − | CD_3_2 + |
| CD_1_3 + | CD_2_3 − | CD_1_4 + | CD_2_4 − |
| CD_4_3 − | CD_3_3 + | CD_4_4 − | CD_3_4 + |

| CD_1_1 − | CD_2_1 + | CD_1_2 − | CD_2_2 + |
|---|---|---|---|
| CD_4_1 + | CD_3_1 − | CD_4_2 + | CD_3_2 − |
| CD_1_3 − | CD_2_3 + | CD_1_4 − | CD_2_4 + |
| CD_4_3 + | CD_3_3 − | CD_4_4 + | CD_3_4 − |

| CD_4_1 | CD_3_2 | CD_4_3 |
|---|---|---|
| − | + | − |
| CD_3_1 | CD_2_2 | CD_3_3 |
| + | − | + |
| CD_2_1 | CD_1_2 | CD_2_3 |
| − | + | − |
| CD_1_1 | | CD_1_3 |
| + | | + |

(with CD_4_2 | − on top, label 1220)

FIG. 12(a)

| CD_4_1 | CD_3_2 | CD_4_3 |
|---|---|---|
| + | − | + |
| CD_3_1 | CD_2_2 | CD_3_3 |
| − | + | − |
| CD_2_1 | CD_1_2 | CD_2_3 |
| + | − | + |
| CD_1_1 | | CD_1_3 |
| − | | − |

(with CD_4_2 | + on top, label 1210)

| CD_1_1 + | CD_2_1 − | CD_3_1 + | CD_4_1 − |
| CD_2_2 − | CD_3_2 + | CD_4_2 − | |
| CD_1_3 + | CD_2_3 − | CD_3_3 + | CD_4_3 − |

| CD_1_1 − | CD_2_1 + | CD_3_1 − | CD_4_1 + |
| CD_2_2 + | CD_3_2 − | CD_4_2 + | |
| CD_1_3 − | CD_2_3 + | CD_3_3 − | CD_4_3 + |

LARGE PIXEL MULTI-DOMAIN VERTICAL ALIGNMENT LIQUID CRYSTAL DISPLAY USING FRINGE FIELDS

RELATED APPLICATIONS

This is a divisional of co-pending application Ser. No. 11/227,595 (filed Sep. 15, 2005) entitled "Large Pixel Multi-Domain Vertical Alignment Liquid Crystal Display using Fringe Fields by Hiap L. Ong.

BACKGROUND OF THE INVENTION

1. Field of the Invention

The present invention relates to liquid crystal displays (LCDs). More specifically, the present invention relates large-pixel multi-domain vertical alignment LCDs, which can be manufactured with smooth substrates.

2. Discussion of Related Art

Liquid crystal displays (LCDs), which were first used for simple monochrome displays, such as calculators and digital watches, have become the dominant display technology. LCDs are used routinely in place of cathode ray tubes (CRTs) for both computer displays and television displays. Various drawbacks of LCDs have been overcome to improve the quality of LCDs. For example, active matrix displays, which have largely replaced passive matrix displays, reduce ghosting and improve resolution, color gradation, viewing angle, contrast ratios, and response time as compared to passive matrix displays.

However, the primary drawback of conventional LCDs is the viewing angle is very narrow. Even the viewing angle of active matrixes is much smaller than the viewing angle for CRT. Specifically, while a viewer directly in front of an LCD receives a high quality image, other viewers to the side of the LCD would not receive a high quality image. Multi-domain vertical alignment liquid crystal displays (MVALCDs) were developed to improve the viewing angle of LCDs. FIGS. 1(a)-1(c) illustrate the basic functionality of a pixel of a vertical alignment LCD 100. For clarity, the LCD of FIG. 1 uses only a single domain. Furthermore, for clarity, the LCDs of FIGS. 1(a)-1(c) (and FIG. 2) described in terms of gray scale operation.

LCD 100 has a first polarizer 105, a first substrate 110, a first electrode 120, a first alignment layer 125, liquid crystals 130, a second alignment layer 140, a second electrode 145, a second substrate 150, and a second polarizer 155. Generally, first substrate 110 and second substrate 150 are made of a transparent glass. First electrode 120 and second electrode 145 are made of a transparent conductive material such as ITO (Indium Tin Oxide). First alignment layer 125 and second alignment layer 140, which are typically made of a polyimide (PI) layer, align liquid crystals 130 in a resting state. In operation, a light source (not shown) sends light from beneath first polarizer 105, which is attached to first substrate 110. First polarizer 105 is generally polarized in a first direction and second polarizer 155, which is attached to second substrate 150, is polarized perpendicularly to first polarizer 105. Thus, light from the light source would not pass through both first polarizer 105 and second polarizer 155 unless the light polarization were to be rotated by 90 degrees between first polarizer 105 and second polarizer 155. For clarity, very few liquid crystals are shown. In actual displays, liquid crystals are rod like molecules, which are approximately 5 angstroms in diameter and 20-25 angstroms in length. Thus, there are over 10 million liquid crystal molecules in a pixel that is 100 μm width by 300 μm length by 3 μm height.

In FIG. 1(a), liquid crystals 130 are vertically aligned. In the vertical alignment, liquid crystals 130 would not rotate light polarization from the light source. Thus, light from the light source would not pass through LCD 100. However, as illustrated in FIG. 1(b), when an electric field is applied between first electrode 120 and second electrode 145, liquid crystals 130 reorientate to a tilted position. Liquid crystals in the tilted position rotate the polarization of the polarized light coming through first polarizer 105 by ninety degrees so that the light can then pass through second polarizer 155. The amount of tilting, which controls the amount of light passing through the LCD (i.e., brightness of the pixel), is proportional to the strength of the electric field. Generally, a single thin-film-transistor (TFT) is used for each pixel. However for color displays, a separate TFT is used for each color component (typically, Red, Green, and Blue)

However, the light passing through LCD 100 is not uniform to viewers at different viewing angles. As illustrated in FIG. 1(c), a viewer 210 that is left of center would see a bright pixel because the broad (light rotating) side of liquid crystals 130 face view 210. A viewer 220 that is centered on the pixel would see a gray pixel because the broad side of liquid crystals 130 is only partially facing viewer 220. A viewer 230 that is right of center would see a dark pixel because the broad side of liquid crystals 130 is barely facing viewer 230.

Multi-domain vertical alignment liquid crystal displays (MVALCDs) were developed to improve the viewing angle problems of single-domain vertical alignment LCDs. FIG. 2 illustrates a pixel of a multi-domain vertical alignment liquid crystal display (MVALCD) 200. MVALCD 200 includes a polarizer 205, a first substrate 210, a first electrode 220, a first alignment layer 225, liquid crystals 235, liquid crystals 237, protrusions 260s, a second alignment layer 240, a second electrode 245, a second substrate 250, and a second polarizer 255. Liquid crystals 235 form the first domain of the pixel and liquid crystals 237 form the second domain of the pixel. When an electric field is applied between first electrode 220 and second electrode 245, protrusions 260 cause liquid crystals 235 to tilt in a different direction than liquid crystals 237. Thus, a viewer 272 that is left of center would see the left domain (liquid crystals 235) as black and the right domain (liquid crystals 237) as white. A viewer 274 that is centered would see both domains as gray. A viewer 276 that is right of center would see the left domain as white and the right domain as black. However, because the individual pixels are small, all three viewers would perceive the pixel as being gray. As explained above, the amount of tilting of the liquid crystals is controlled by the strength of the electric field between electrodes 220 and 245. The level of grayness perceived by the viewer directly related to the amount of tilting of the liquid crystals. MVALCDs can also be extended to use four domains so that a pixel is divided into 4 domains to provide wide symmetrical viewing angles both vertically and horizontally.

Thus, multi-domain vertical alignment liquid crystal displays, provide wide symmetrical viewing angles, however, the cost of manufacturing MVALCDs are very high due to the difficulty of adding protrusions to the top and bottom substrates and the difficulty of properly aligning the protrusions on the top and bottom substrates. Specifically, a protrusion on the bottom substrate must be located at the center of two protrusions on the top substrate. Other techniques of using physical features to the substrates, such as ITO slits, which have been used in place of or in combination with the protrusions, are also very expensive to manufacture. Furthermore, the protrusions and ITO slits inhibit light transmission and thus reduces the brightness of the MVALCDs. Hence, there is a need for a method or system that can provide multi-domain vertical alignment liquid crystal displays, without the need for difficult to manufacture physical features such as protrusions and ITO-slits, and without the need to have ultra precise alignment of the top and bottom substrates.

SUMMARY

Accordingly, the present invention provides a MVA-LCD that does not require protrusions or ITO slits. Thus manufacturing of MVA-LCDs in accordance with the present invention is less expensive than conventional MVALCDs. Specifically, a MVALCD in accordance with one embodiment of the present invention subdivides a pixel into color components, which are further subdivided into color dots. The dots are arranged so that the fringe field of adjoining dots causes the liquid crystals of a dot to tilt in different directions to form multiple domains.

For example, in some embodiment of the present invention, a pixel includes a first set of color dots having a first dot polarity and a second set of color dots having a second dot polarity. The color dots are arranged so to form a checkerboard pattern of color dots of the first dot polarity and color dots of the second dot polarity. The pixel includes multiple color components, for example in one embodiment of the present invention the first plurality of color dots include color dots from a first color component and a third color component. The second plurality of color dots include color dots from a second color component.

In most embodiments of the present invention, the checkerboard pattern of dot polarities causes each color dot includes multiple liquid crystal domains. Specifically, fringe fields in each color dot are enlarged by the different dot polarities of neighboring pixels. The enhanced fringe field cause the liquid crystals inside the color dot to reorientate and tilt in different direction to form multiple crystal domains.

To create a checkerboard pattern of color dots across the entire display, different arrangement of pixel designs are used. For example in one embodiment of the present invention, a display includes a plurality of odd numbered rows of pixels and a plurality of even numbered rows of pixels. The pixels in the odd numbered rows are of a first pixel design and alternate between a first dot polarity pattern and a second dot polarity pattern. The pixels in the even numbered rows are of the first pixel design and also alternate between the first dot polarity pattern and the second dot polarity pattern. In another embodiment of the present invention, the pixels on the even numbered rows are of a second pixel design that alternate between a first dot polarity pattern and a second dot polarity pattern. In still other embodiments of the present invention, pixels on each row are of the same dot polarity pattern while pixels in each column alternate between dot polarity patterns. The various arrangement of pixels depend on the specific pixel design and is influenced by color distribution and electrical distribution.

The present invention will be more fully understood in view of the following description and drawings.

BRIEF DESCRIPTION OF THE DRAWINGS

FIGS. 5(a)-5(c) illustrate dot polarity patterns and a liquid crystal display in accordance with one embodiment of the present invention.

FIGS. 6(a)-6(c) illustrate dot polarity patterns and a liquid crystal display in accordance with one embodiment of the present invention.

FIGS. 7(a)-7(c) illustrate pixel designs, dot polarity patterns and liquid crystal displays in accordance with one embodiment of the present invention.

FIGS. 7(d)-7(f) illustrate pixel designs, dot polarity patterns and liquid crystal displays in accordance with one embodiment of the present invention.

FIGS. 8(a)-8(c) illustrate pixel designs, dot polarity patterns and liquid crystal displays in accordance with one embodiment of the present invention.

FIGS. 8(d)-8(f) illustrate pixel designs, dot polarity patterns and liquid crystal displays in accordance with one embodiment of the present invention.

FIGS. 9(a)-9(c) illustrate pixel designs, dot polarity patterns and liquid crystal displays in accordance with one embodiment of the present invention.

FIGS. 9(d)-9(f) illustrate pixel designs, dot polarity patterns and liquid crystal displays in accordance with one embodiment of the present invention.

FIGS. 10(a)-10(b) illustrate pixel designs and dot polarity patterns in accordance with one embodiment of the present invention.

FIGS. 11(a)-11(b) illustrate pixel designs and dot polarity patterns in accordance with one embodiment of the present invention.

FIGS. 12(a)-12(c) illustrate pixel designs, dot polarity patterns and liquid crystal displays in accordance with one embodiment of the present invention.

FIGS. 12(d)-12(f) illustrate pixel designs, dot polarity patterns and liquid crystal displays in accordance with one embodiment of the present invention.

DETAILED DESCRIPTION

As explained above, conventional MVALCDs are very expensive to manufacture due to the use of physical features, such as protrusions or ITO slits, for creating the multiple domains of each pixel. However, MVALCDs in accordance with the principles of the present invention use fringe fields to create multiple-domains and do not require the use of physical features (such as protrusions or ITO slits) on the substrate. Furthermore, without the requirement of physical features the difficulty of aligning the physical features of the top and bottom substrate is also eliminated. Thus, MVALCDs in accordance with the present invention are higher yield and less expensive to manufacture than conventional MVALCDs.

Figure 1B:
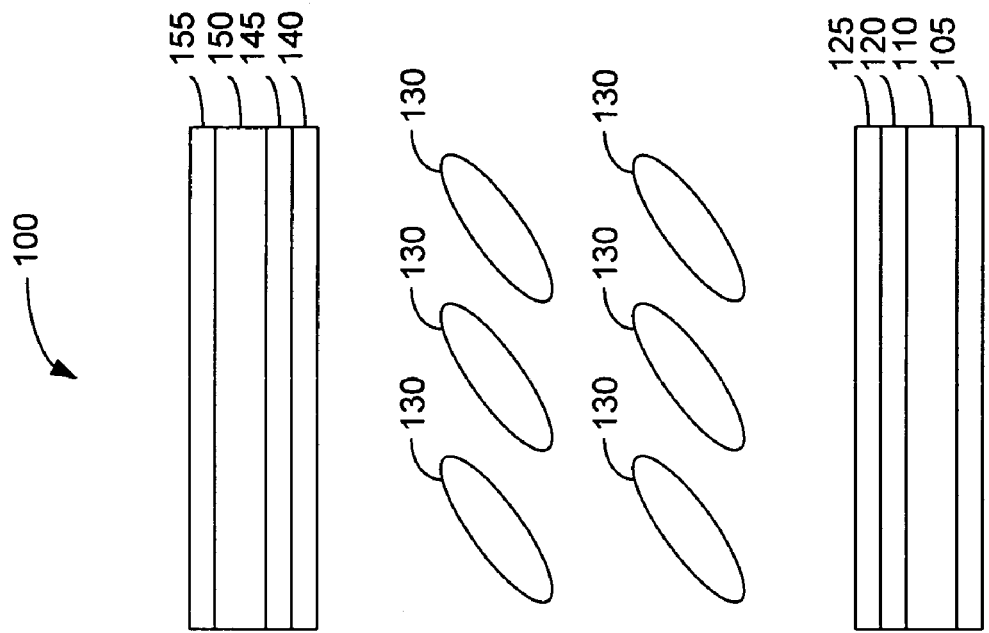
FIGS. 1(a)-1(c) is an illustration of a pixel of a conventional single domain vertical alignment LCD.
Figure 1A:
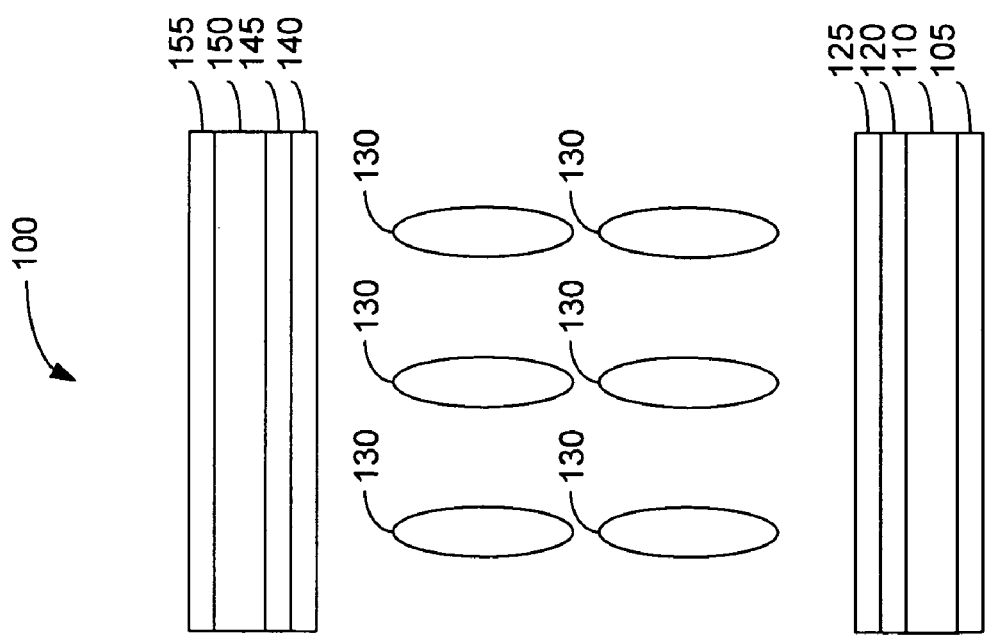
Figure 1C:
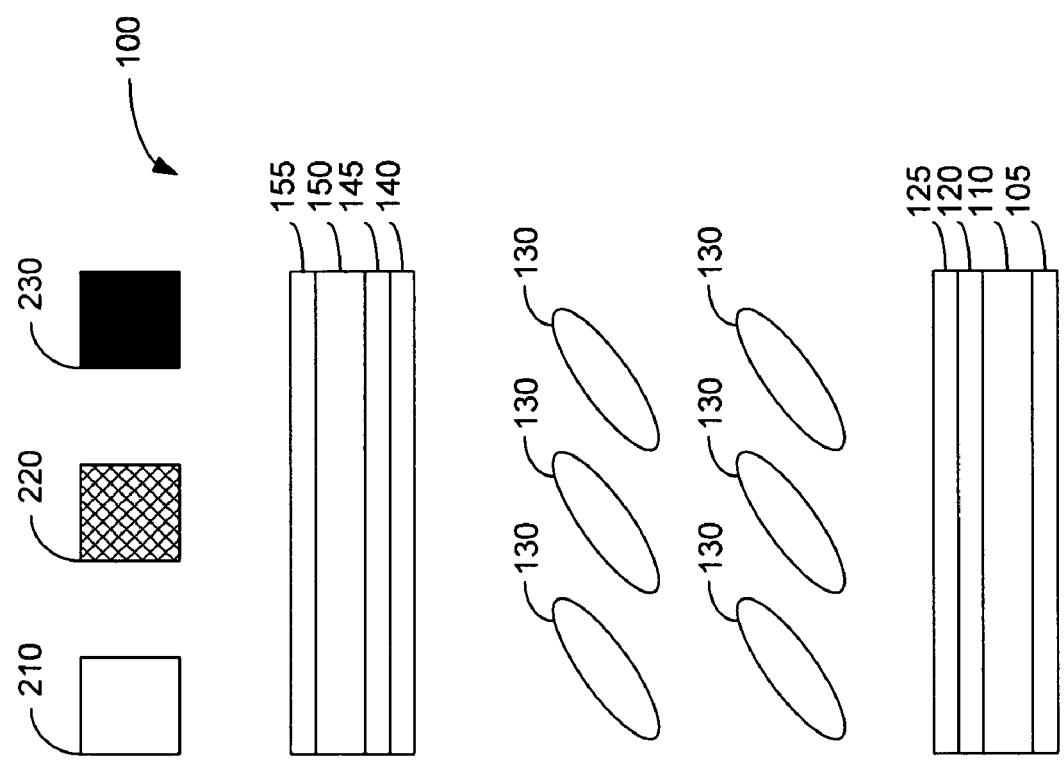
Figure 2:
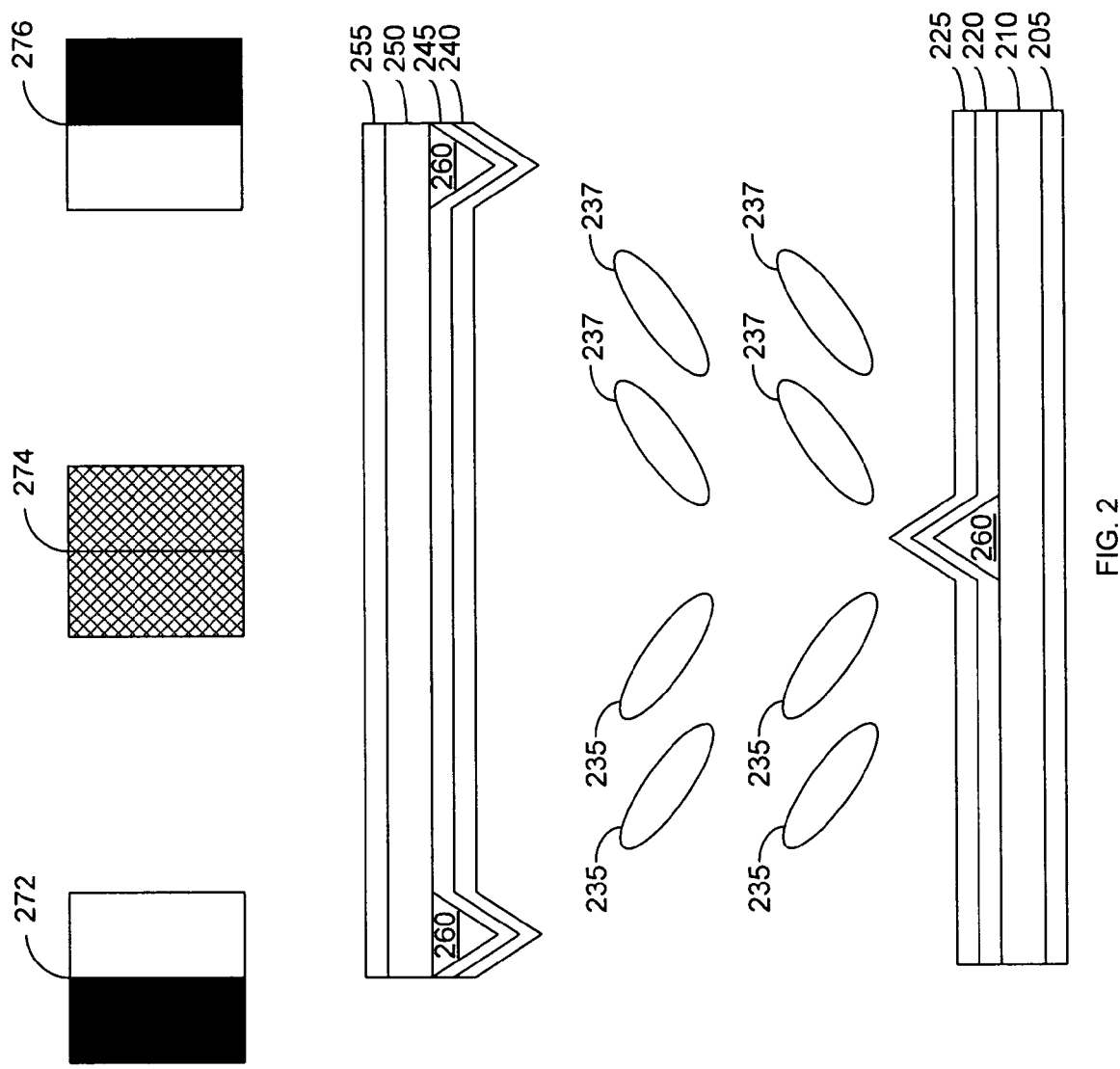
FIG. 2 is an illustration of a pixel of a conventional multi-domain vertical alignment LCD.
Figure 3A:
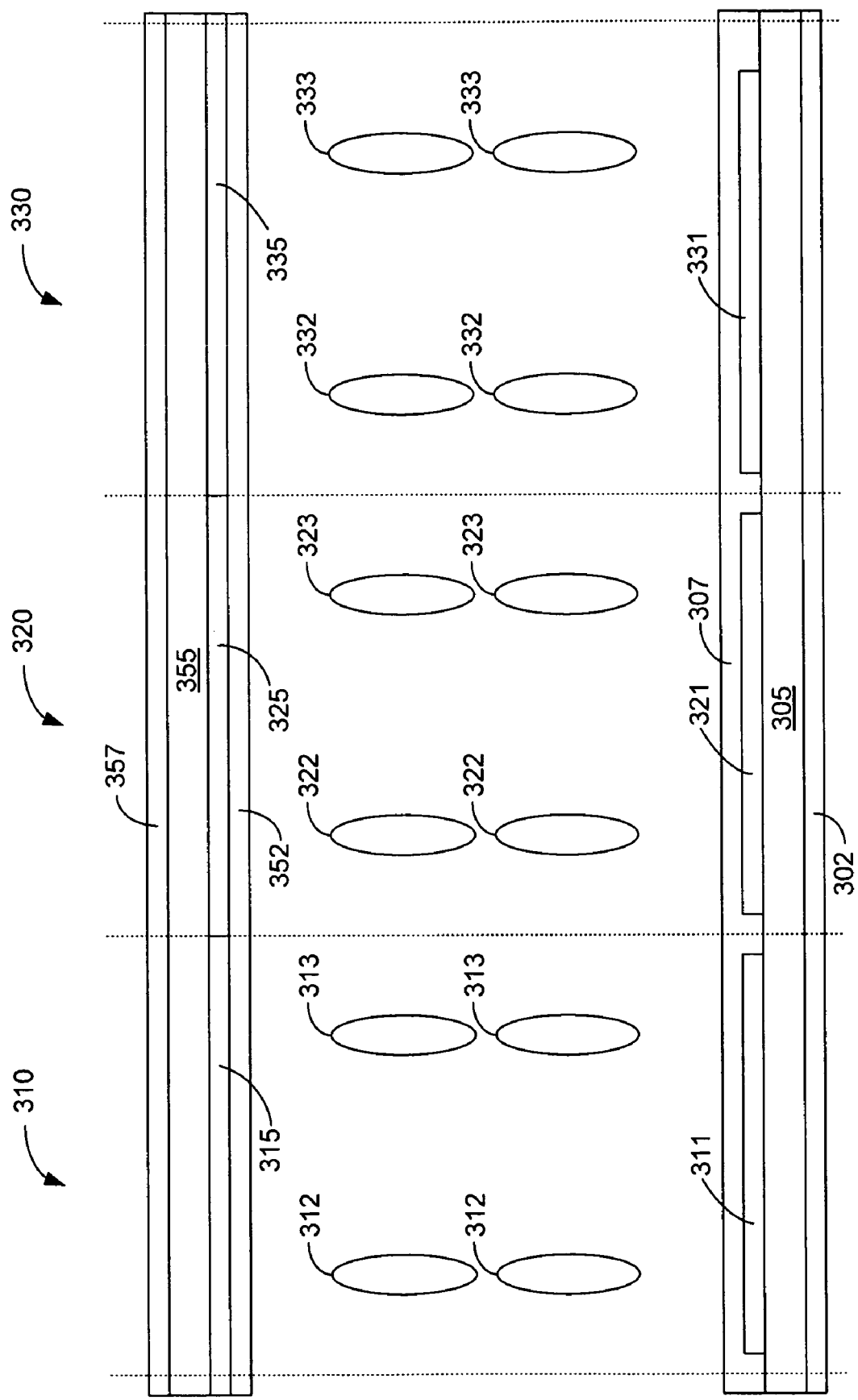
FIGS. 3(a)-3(b) illustrates a multi-domain vertical alignment liquid crystal display in accordance with one embodiment of the present invention.
Figure 3B:
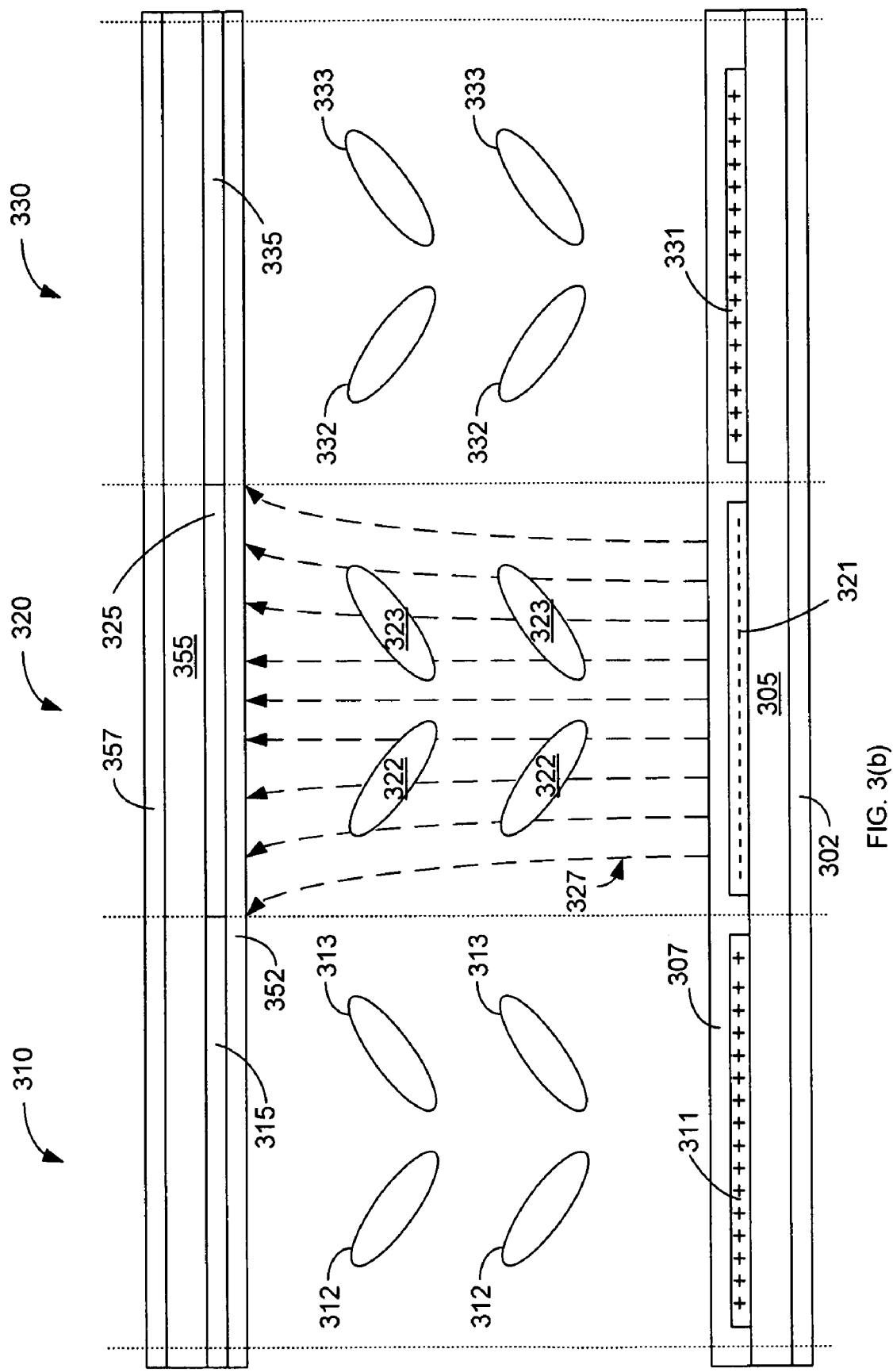

FIGS. 3(a) and 3(b) illustrate the basic concept used in accordance with the present invention to create a multi-domain vertical alignment liquid crystal display (MVALCD) 300 without resorting to physical features on the substrates. Specifically FIG. 3 shows pixels 310, 320, and 330 in between a first substrate 305 and a second substrate 355. A first polarizer 302 is attached to first substrate 305 and a second polarizer 357 is attached to second substrate 355. Pixel 310 includes a first electrode 311, liquid crystals 312, liquid crystals 313 and a second electrode 315. Pixel 320 includes a first electrode 321, liquid crystals 322, liquid crystals 323 and a second electrode 325. Similarly, pixel 330 includes a first electrode 331, liquid crystals 332, liquid crystals 333 and a second electrode 335. The electrodes are typically constructed using a transparent conductive material such as ITO. Furthermore, a first alignment layer 307 covers the electrodes on first substrate 305. Similarly a second alignment layer 352 covers the electrodes on second substrate 355. As explained in more detail below, electrodes 315, 325, and 335 are held at a common voltage V_Com. Therefore, to ease manufacturing, electrodes 315, 325, and 335 are created as a single structure (as shown in FIGS. 3(a) and 3(b)). MVALCD 300 operates pixels 310, 320, and 330 using alternating polarities. For example, if the polarities of pixels 310 and 330 are positive then the polarity of pixel 320 would be negative. Conversely, if the polarities of pixel 310 and 330 are negative then the polarity of pixel 320 would be positive. Generally, the polarity of each pixel would switch between frames, but the pattern of alternating polarities is maintained in each frame. In FIG. 3(a), pixels 310, 320, and 330 are in the "OFF" state, i.e. with the electric field between the first and second electrodes turned off. In the "OFF" state some residual electric field may be present between the first and second electrode. However, the residual electric field is generally too small to tilt the liquid crystals.

In FIG. 3(b), pixels 310, 320, and 330 are in the "ON" state. 3(b) uses "+" and "−" to denote the charge state of the electrodes. Thus, electrodes 311, and 331 are positively charged and electrodes 321 are negatively charged. Substrate 355 and electrodes 315, 325, and 335 are kept at common voltage V_com. Electric field 327 (illustrated using field lines) between electrodes 321 and 325 causes liquid crystals 322 and liquid crystals 323 to tilt. In general, without protrusions or other features the tilting direction of the liquid crystals is not fixed. However, the fringe field at the edges of the pixel can influence the tilting direction of the liquid crystals. For example, electric field 327 between electrode 321 and electrode 325 is vertical around the center of pixel 320 but is tilted to the left in the left part of the pixel, and tiled to the right in the right part of the pixel. Thus, the fringe fields of between electrode 321 and electrode 325 cause liquid crystals 323 to tilt to the right to form one domain and cause liquid crystals 322 to tilt to the left to from a second domain. Thus, pixel 320 is a multi-domain pixel with a wide symmetrical viewing angle Similarly, the electric field (not shown) between electrode 311 and electrode 315 would have fringe fields that cause liquid crystals 313 to reorientate and tilt to the right in the right side in pixel 310 and cause liquid crystals 312 to tilt to the left in the left side in pixel 310. Similarly, the electric field (not shown) between electrode 331 and electrode 335 would have fringe fields that cause liquid crystals 333 to tilt to the right in the right side in pixel 330 and cause liquid crystals 332 to tilt to the left in the left side in pixel 330.

Alternating polarity of adjacent pixels enhances the fringe field effect. Therefore, by repeating the alternating polarity pattern between rows of pixels (or columns of pixels), a multi domain vertical alignment LCD is achieved without physical features. Furthermore, an alternating polarity checkerboard pattern can be used to create four domains in each pixel.

However, fringe field effects are relatively small and weak, in general. Consequently, as pixels become larger, the fringe fields at the edge of the pixels would not reach all the liquid crystals within a pixel. Thus, in large pixels the direction of tilting for the liquid crystals not near the edge if the pixels would exhibit random behavior and would not produce a multi-domain pixel. Generally, fringe field effects of pixels would not be effective to control liquid crystal tilt when the pixels become larger than 30-50 μm. Therefore, for large pixel LCDs a novel pixel division method is used to achieve multi-domain pixels.

Figure 4A:
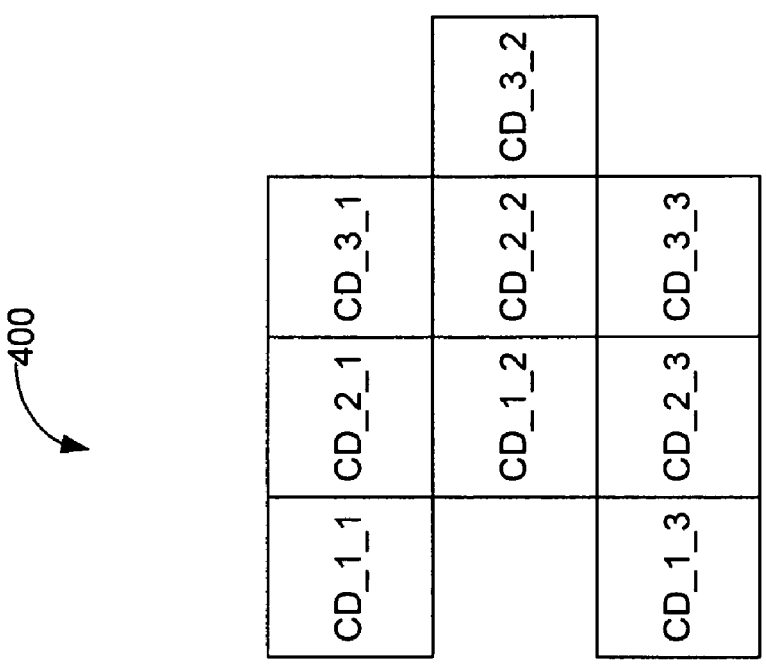
FIGS. 4(a)-4(b) illustrates a pixel design in accordance with one embodiment of the present invention.

Specifically, for color LCDs, pixels are divided into color components. Each color component is controlled by a separate thin-film transistor (TFT). Generally, the color components are red, green, and blue. In accordance with the present invention, the color components of a pixel are further divided into color dots. FIG. 4(a) illustrates a novel pixel design in accordance with one embodiment of the present invention. Specifically, FIG. 4(a) shows a pixel 400 divided into three color components. Each of the three color components is further divided into three color dots. For clarity, the color dots are referenced as CD_X_Y, where X is a color component (from 1 to 3) and Y is a dot number (from 1 to 3). Specifically, pixel 400 is a pixel formed by nine color dots. Color dots CD_1_1 (i.e., the first color dot of color component 1), CD_2_1 (i.e., the first color dot of the second color component), and CD_3_1 (i.e., the first color dot of the third color component) form the first row of pixel 400. Color dots CD_1_2, CD_2_2, and CD_3_2 form a second row of pixel 400. However the second row is offset from the first row so that color dot CD_1_2 is adjacent to color dot CD_2_1. Color dots CD_1_3, CD_2_3, and CD_3_3 form the third row of pixel 400. However the third row is aligned with the first row so that color dot CD_2_3 is adjacent to color dot CD_1_2.

Figure 4B:
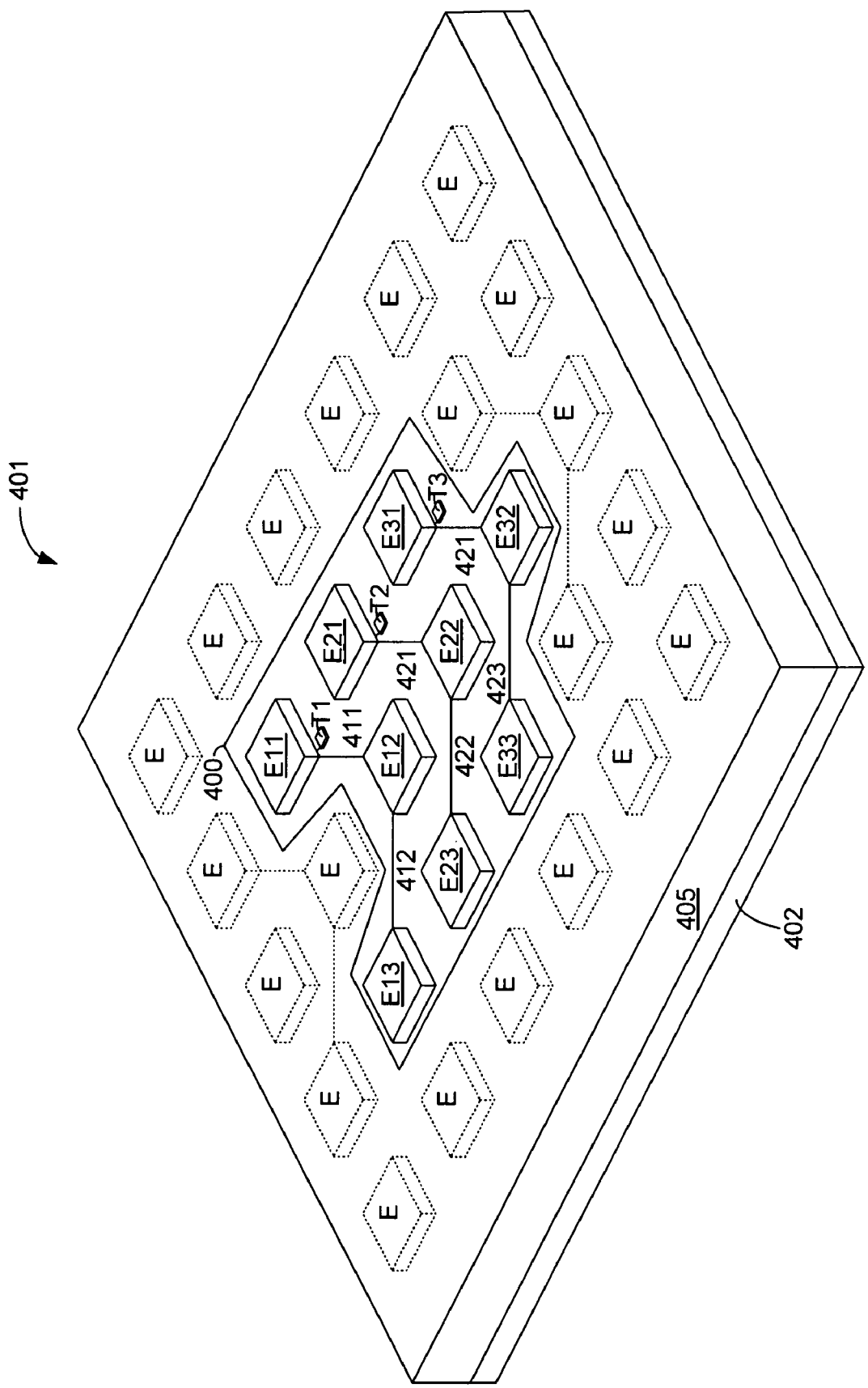

The color dots of a color component are controlled by a switching element, such as a thin-film transistor (TFT), thus the polarity of all the color dots of one color components are the same. Various designs can be used to make the electrical connections between the color dots of a color component. For example, some embodiments of the present invention use ITO connections, which are optically transparent, from the switching element to the color dots. FIG. 4(b) shows a perspective view of a portion of an LCD 401 with pixel 400. Specifically, FIG. 4(b) shows a polarizer 402 attached to a substrate 405. Electrodes E11, E12, E13, E21, E22, E23, E31, E32, and E33 of pixel 400 are formed on the top surface of substrate 405. Various electrodes (E) of other pixels are also formed on substrate 304. For clarity, the electrodes of other pixels are shown with dotted lines. An alignment layer (not shown) would cover the electrodes. Also shown in FIG. 4(b) are transistors T1, T2, and T3 of Pixel 400. For clarity the transistors of other pixels are not shown in FIG. 4(b).

Electrodes E11, E12, E13, E21, E22, E23, E31, E32, and E33 correspond with color dots CD_1_1, CD_1_2, CD_1_3, CD_2_1, CD_2_2, CD_2_3, CD_3_1, CD_3_2, and CD_3_3 respectively. As explained above color dots CD_1_1, CD_1_2, and CD_1_3 are electrically connected and electrically controlled and switched by a single switching device such as a thin-film transistor, which is located at color dot CD_1_1. Thus as shown in FIG. 4(b), transistor T1 is coupled to electrode E11 and electrodes Eli, E12, and E13 are electrically connected by connectors 411 and 412. Connectors 411 and 412 are usually formed of a transparent conductive material such as ITO. Similarly, color dots CD_2_1, CD_2_2, and CD_2_3 are electrically connected and electrically controlled and switched by a single switching device, which is located at color dot CD_2_1. Thus as shown in FIG. 4(b), transistor T2 is coupled to electrode E21 and electrodes E21, E22, and E23 are electrically connected by connectors 421 and 422. Likewise, Color dots CD_3_1, CD_3_2, and CD_3_3 are electrically connected and electrically controlled and switched by a single switching device, which is located at color dot CD_3_1. Thus as shown in FIG. 4(b), transistor T3 is coupled to electrode E31 and electrodes E31, E32, and E33 are electrically connected by connectors 431 and 432.

Figure 5C:
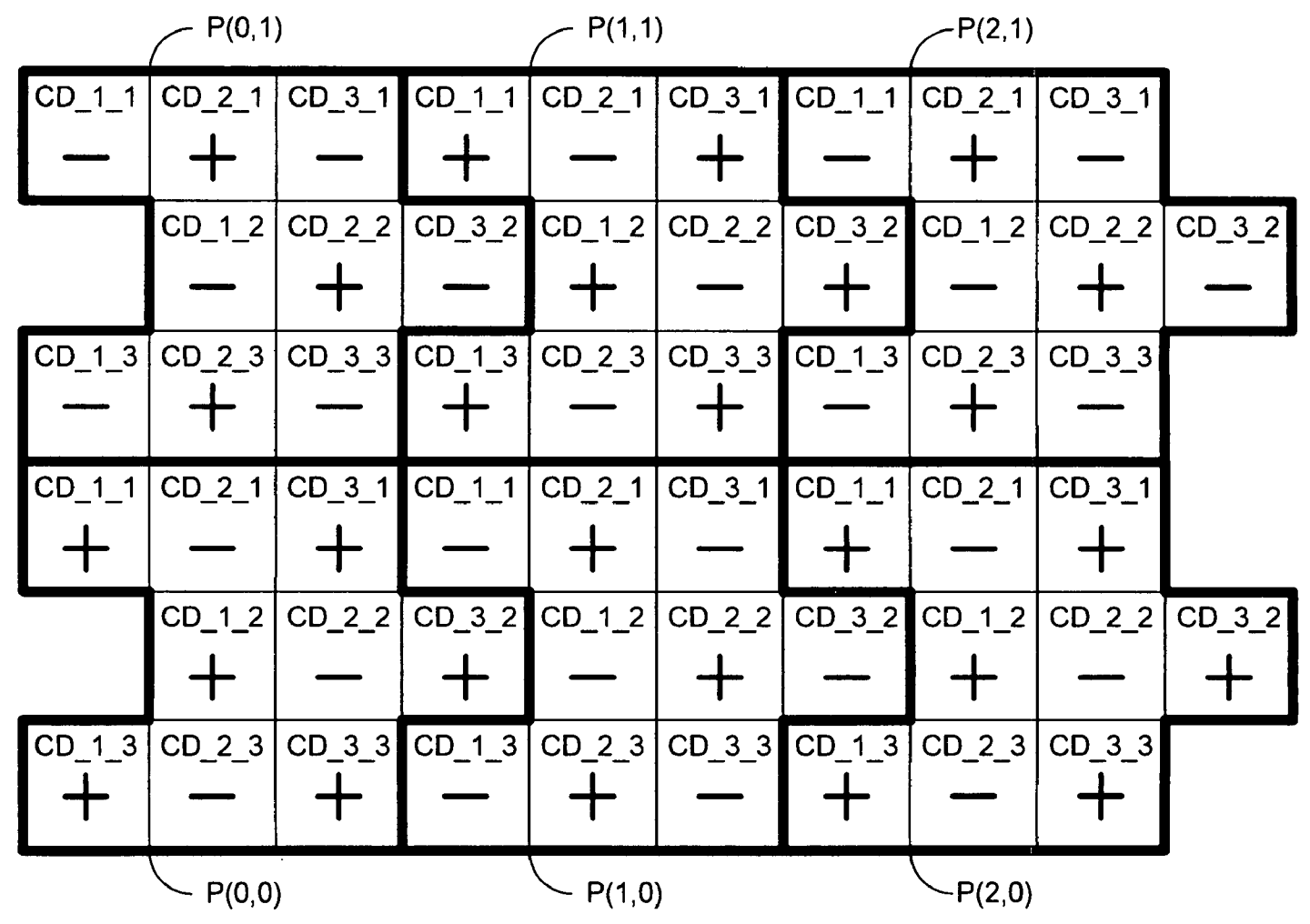

To achieve multiple domains, the first and third color components of a pixel have the same polarity and the second component has the opposite polarity. However for adjacent pixels the polarities are reversed. For MVALCDs using the pixel layout of FIG. 4, two different dot polarity patterns are used for the pixels. FIGS. 5(*a*) and 5(*b*) illustrate the two dot polarity patterns. In FIG. 5(*a*), pixel 510 is an example of the first dot polarity pattern, which has positive polarity at the second color component, i.e., color dots CD_2_1, CD_2_2, and CD_2_3, and negative polarity at the first and third color components, i.e., CD_1_1, CD_1_2, CD_1_3, CD_3_1, CD_3_2, and CD_3_3. In FIG. 5(*b*), pixel 520 is an example of the second dot polarity pattern, which has negative polarity at the second color component, i.e., color dots CD_2_1, CD_2_2, and CD_2_3, and positive polarity at the first and third color components, i.e., CD_1_1, CD_1_2, CD_1_3, CD_3_1, CD_3_2, and CD_3_3. In actual operation a pixel will switch between the first dot polarity pattern and the dot second polarity pattern between each image frame. For clarity, the dot polarity pattern, in which the first color dot of the first color component has a positive polarity, is referred to as the positive polarity pattern. Conversely, the dot polarity pattern in which the first color dot of the first color component has a negative polarity is referred to as the negative dot polarity pattern. Thus, FIG. 5(*a*) is the negative dot polarity pattern and FIG. 5(*b*) is the positive dot polarity pattern for the pixel design of FIG. 4.

Pixels using the pixel design of FIG. 4 should be arranged in a checkerboard pattern with half the pixels having the positive dot polarity pattern and half the pixels having the negative dot polarity pattern. FIG. 5(*c*) illustrates the checkerboard pattern with pixels P(0, 0), P(1, 0), P(2, 0), P(0, 1), P(1, 1), and P(2, 1). Specifically, as illustrated in FIG. 5(*c*), a pixel P(x,y) is in the xth column (from the left and the y-th row starting from the bottom, with pixel P(0,0) being the bottom left corner. Pixels P(0, 0), P(2, 0) and P(1, 1) have the positive dot polarity pattern and pixels P(1, 0), P(0, 1), and P(2, 1) have the negative dot polarity pattern. Thus, in general a pixel P(x, y) has the negative dot polarity pattern if x plus y is an odd number. Conversely, pixel P(x, y) has the positive dot polarity pattern if x plus y is an even number. However, at the next frame the pixels will switch dot polarity patterns. Thus, a MVALCD using the pixel design of FIG. 4 has a first set of pixels having a first dot polarity pattern and a second set of pixels having a second dot polarity pattern. The first set of pixels and the second set of pixels are arranged in a checkerboard pattern.

A close examination of FIG. 5(*c*) reveals that the color dots also have a checkerboard pattern in terms of polarity. Thus, for each color dot of a first polarity, the four adjacent color dots will be of a second polarity. For example, color dot CD_3_1 of pixel P(0, 0), which has a positive polarity, is surrounded by four color dots of negative polarity. Specifically, color dots CD_3_3 of pixel P(0, 1), color dot CD_1_1, of pixel P(1, 0), and color dots CD_2_1 and CD_2_2 of pixel P(0, 0). As explained above, polarity inversion between neighboring color dots enhances the fringe field of the color dots. Because the color dots are quite small, fringe fields from the color dots will cause multiple domains in the liquid crystals of each color dot under the principles explained above with respect to FIGS. 3(*a*) and 3(*b*).

Figure 6B:
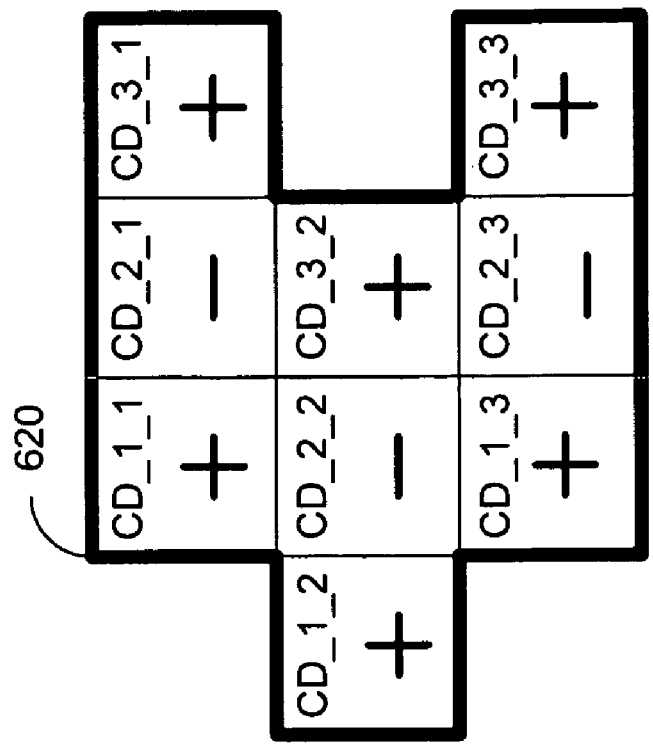
Figure 6A:
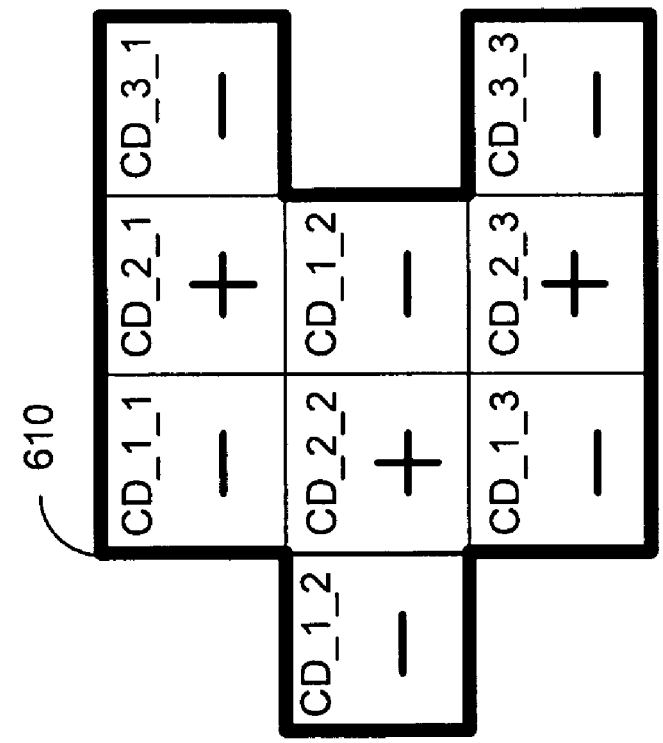

In FIG. 5(*c*), color dots of the same color components within a pixel exhibit a zig-zag pattern. However, color dots of the same color component in adjacent pixels are adjacent at the boundary of the pixels. For example, color dot CD_1_3 of pixel P(0,1) is directly above color dot CD_1_1 of pixel P(0,0). Therefore, in some embodiments of the present invention, a liquid crystal display combines two pixel designs to provide a more symmetrical color distribution. FIGS. 6(*a*)-6(*b*) show dot polarity patterns of a pixel design that can be used with the pixel design of FIG. 4 to create multi-domain vertical alignment liquid crystal display (MVALCD) having more symmetrical color distribution.

In FIG. 6(*a*) each color component is divided into 3 color dots. Color dots CD_1_1 (i.e., the first color dot of color component 1), CD_2_1 (i.e., the first color dot of the second color component), and CD_3_1 (i.e., the first color dot of the third color component) form the first row of pixel 610. Color dots CD_1_2, CD_2_2, and CD_3_2 form a second row of pixel 610. However the second row is offset from the first row so that color dot CD_1_1 is adjacent to color dot CD_2_2. Color dots CD_1_3, CD_2_3, and CD_3_3 form the third row of pixel 610. However the third row is aligned with the first row so that color dot CD_1_3 is adjacent to color dot CD_2_2. Pixel 610 is an example of the negative dot polarity pattern, which has positive polarity at the second color component, i.e., color dots CD_2_1, CD_2_2, and CD_2_3, and negative polarity at the first and third color components, i.e., CD_1_1, CD_1_2, CD_1_3, CD_3_1, CD_3_2, and CD_3_3. In FIG. 6(*b*), pixel 620 is an example of the positive dot polarity pattern, which has negative polarity at the second color component, i.e., color dots CD_2_1, CD_2_2, and CD_2_3, and positive polarity at the first and third color components, i.e., CD_1_1, CD_1_2, CD_1_3, CD_3_1, CD_3_2, and CD_3_3. In actual operation a pixel will switch between the positive dot polarity pattern and the negative dot polarity pattern between each image frame.

The pixels of a MVALCD using the pixel design of FIGS. 4, 5(*a*) and 5(*b*) with the pixel design of FIGS. 6(*a*)-6(*b*) should arranged in alternating rows with alternating dot polarity patterns arrangement. For example, odd rows would use the pixel design of FIGS. 4, 5(*a*) and 5(*b*), while even rows would use the pixel design of FIGS. 6(*a*) and 6(*b*). Pixels in each row would have alternating dot polarity patterns. FIG. 6(*c*) illustrates the alternating row with alternating dot polarity patterns arrangement with pixels P(0, 0), P(1, 0), P(2, 0), P(0, 1), P(1, 1), and P(2, 1). Pixels P(0, 0), P(1,0) and P(2, 0) use the pixel design of FIGS. 6(*a*)-6(*b*) and Pixels P(0, 1), P(1, 1), and P(2, 1) use the pixel design of FIGS. 4, 5(*a*), and 5(*b*). Furthermore, Pixels P(0, 0) and Pixels P(2, 0) have the negative dot polarity pattern of FIG. 6(*a*) while pixel P(1, 0) has the positive dot polarity pattern of Pixel 6(*b*). Similarly, Pixels P(0, 1) and P(2, 1) have the negative dot polarity pattern of FIG. 5(*a*) while pixel P(1, 1) has the positive dot polarity pattern of FIG. 5(*b*). However, at the next frame the pixels will switch dot polarity patterns. Thus, the MVALCD of FIG. 6(*c*) has a first set of pixels having of a first pixel design and a first dot polarity pattern, a second set of pixels of the first pixel design and a second dot polarity pattern, a third set of pixels of a second pixel design with a first dot polarity pattern, and a fourth set of pixels having the second pixel design and a second dot polarity pattern. Alternatively, FIG. 6(*c*) can be described as having alternating columns of dot polarity patterns. For example, in one frame even columns have pixels with positive dot polarity patterns and odd columns have pixels with negative dot polarity patterns. In the next frame the even columns would have pixels with negative dot polarity patterns and the odd columns would have pixels with positive dot polarity columns.

Figure 6C:
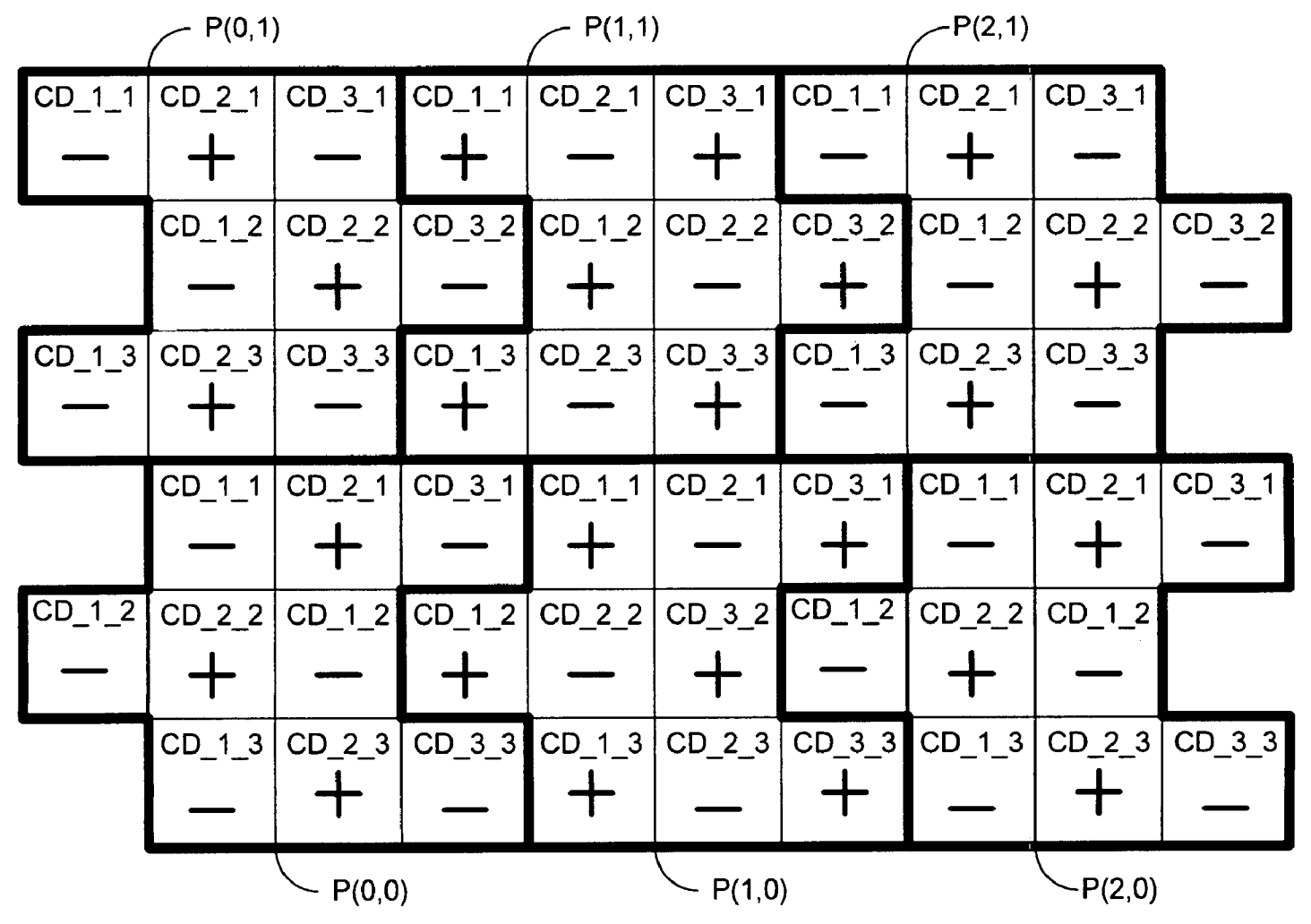

A close examination of FIG. 6(*c*) reveals that the color dots also have a checkerboard pattern in terms of polarity. Thus, for each color dot of a first polarity, the four adjacent color dots will be of a second polarity. For example, color dot CD_3_1 of pixel P(0, 0), which has a negative polarity, is surrounded by four color dots of positive polarity. Specifically, color dots CD_1_3 of pixel P(1, 1), color dots CD_1_1 and CD_1_2 of pixel P(1, 0), and color dot CD_2_1 of pixel P(0, 0). Furthermore, color distribution is more symmetrical as compared to FIG. 5(c) because each color component has a zig-zag pattern both within each pixel and across pixel boundaries. For example, color dots CD_1_1, CD_1_2, and CD_1_3 of pixel P(0,1) and color dots CD_1_1, CD_1_2, and CD_1_3 of pixel P(0,0) form a zig-zag pattern. However, some embodiments of the present invention may still use the pixel pattern of FIG. 5(c) because the pixel pattern in FIG. 5(c) can have a more uniform electrical distribution than the pixel pattern of FIG. 6(c). A more uniform electrical distribution may improve optical performance by reducing flicker and cross-talk.

As explained above, fringe fields are relatively small; therefore, as LCD pixels become larger, further subdivision may be necessary. FIGS. 7(a)-7(b) show dot polarity patterns of a pixel design in accordance with another embodiments of the present invention. Specifically, in FIG. 7(a) each color component of a pixel 710 is divided into 4 color dots. Color dots CD_1_1 (i.e., the first color dot of color component 1), CD_2_1 (i.e., the first color dot of the second color component), and CD_3_1 (i.e., the first color dot of the third color component) form the first row of pixel 710. Color dots CD_1_2, CD_2_2, and CD_3_2 form a second row of pixel 710. However the second row is offset from the first row so that color dot CD_1_2 is adjacent to color dot CD_2_1. Color dots CD_1_3, CD_2_3, and CD_3_3 form the third row of pixel 710. However the third row is aligned with the first row so that color dot CD_2_3 is adjacent to color dot CD_1_2. Finally, color dots CD_1_4, CD_2_4, and CD_3_4 form the fourth row of pixel 710. However, the fourth row is aligned with the second row so that color dot CD_1_4 is adjacent to color dot CD_2_3.

FIG. 7(a) also shows a negative dot polarity pattern for pixel 710. The negative dot polarity pattern has positive polarity at the second color component, i.e., color dots CD_2_1, CD_2_2, CD_2_3, and CD_2_4, and negative polarity at the first and third color components, i.e., CD_1_1, CD_1_2, CD_1_3, CD_1_4, CD_3_1, CD_3_2, CD_3_3, and CD_3_4. In FIG. 7(b), pixel 720 is an example of the positive dot polarity pattern, which has negative polarity at the second color component, i.e., color dots CD_2_1, CD_2_2, CD_2_3, and CD_2_4, and positive polarity at the first and third color components, i.e., color dots CD_1_1, CD_1_2, CD_1_3, CD_1_4, CD_3_1, CD_3_2, CD_3_3, and CD_3_4.

Figure 7C:
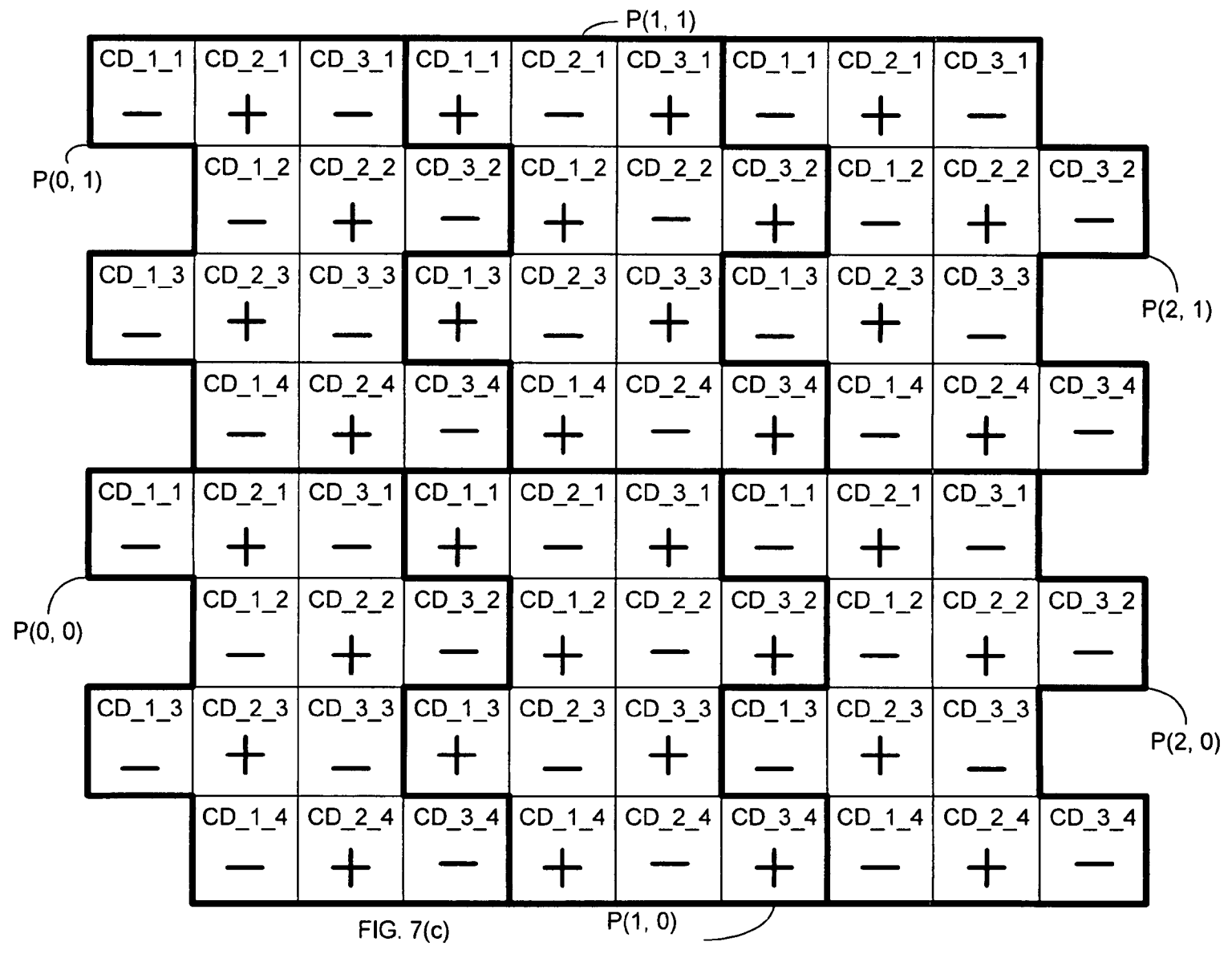

Pixels using the pixel design of FIGS. 7(a) and 7(b) should be arranged in an alternating column pattern so that pixels in even numbered columns have one dot polarity pattern and pixels in odd numbered columns have the other dot polarity pattern. FIG. 7(c) illustrates the alternating column pattern with pixels P(0, 0), P(1, 0), P(2, 0), P(0, 1), P(1, 1), and P(2, 1). Specifically, as illustrated in FIG. 7(c), pixels P(0, 0), P(0, 1), P(2,0) and P(2, 1) have the negative dot polarity pattern, and pixels P(1, 0) and P(1, 1) have the positive dot polarity pattern. Thus, in general a pixel P(x, y) has the first dot polarity pattern if x is an odd number. Conversely, pixel P(x, y) has the second dot polarity pattern if x an even number. However, at the next frame the pixels will switch dot polarity patterns.

In some embodiments of the present invention, a checkerboard pattern of pixel polarity (i.e. positive dot polarity pattern or negative dot polarity pattern) is used instead of an alternating column pattern to provide a more uniform electrical distribution, which can improve the optical performance by reducing flicker and cross-talk. To achieve a checkerboard pattern of pixel polarity, a second pixel design is used with the pixel design of FIGS. 7(a) and 7(b). Specifically, FIGS. 7(d) and 7(e) illustrate the negative dot polarity pattern and positive dot polarity pattern, respectively, of a second pixel design having twelve color dots. As shown in FIG. 7(d) each color component of a pixel 730 is divided into 4 color dots. Color dots CD_1_1 (i.e., the first color dot of color component 1), CD_2_1 (i.e., the first color dot of the second color component), and CD_3_1 (i.e., the first color dot of the third color component) form the first row of pixel 730. Color dots CD_1_2, CD_2_2, and CD_3_2 form a second row of pixel 730. However the second row is offset from the first row so that color dot CD_1_1 is adjacent to color dot CD_2_2. Color dots CD_1_3, CD_2_3, and CD_3_3 form the third row of pixel 730. However the third row is aligned with the first row so that color dot CD_1_3 is adjacent to color dot CD_2_2. Finally, color dots CD_1_4, CD_2_4, and CD_3_4 form the fourth row of pixel 730. However, the fourth row is aligned with the second row so that color dot CD_2_4 is adjacent to color dot CD_1_3.

FIG. 7(d) also shows a negative dot polarity pattern for pixel 730. The negative dot polarity pattern has positive polarity at the second color component, i.e., color dots CD_2_1, CD_2_2, CD_2_3, and CD_2_4, and negative polarity at the first and third color components, i.e., CD_1_1, CD_1_2, CD_1_3, CD_1_4, CD_3_1, CD_3_2, CD_3_3, CD_3_4. In FIG. 7(e), a pixel 740 is an example of the positive dot polarity pattern, which has negative polarity at the second color component, i.e., color dots CD_2_1, CD_2_2, CD_2_3, and CD_2_4, and positive polarity at the first and third color components, i.e., color dots CD_1_1, CD_1_2, CD_1_3, CD_1_4, CD_3_1, CD_3_2, CD_3_3, and CD_3_4.

Figure 7F:
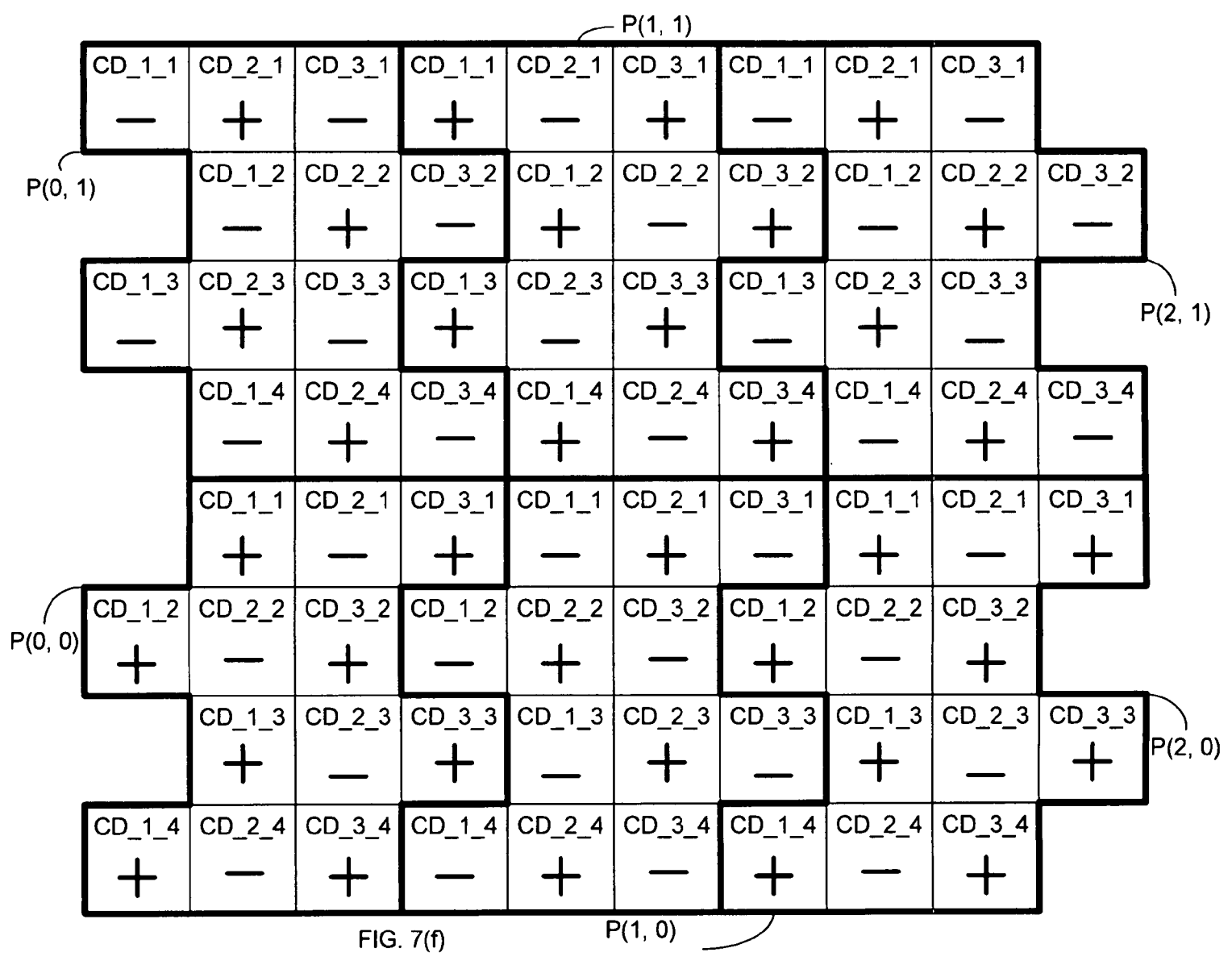

FIG. 7(f) illustrates the checkerboard pixel polarity pattern with pixels P(0, 0), P(1, 0), P(2, 0), P(0, 1), P(1, 1), and P(2, 1). Specifically, as illustrated in FIG. 7(f), pixels P(0, 0), P(1, 0), and P(2,0) use the pixel design of FIGS. 7(d) and 7(e). Pixels P(0, 1), P(1, 1), and P(2, 1) use the pixel design of FIGS. 7(a) and 7(b). Pixels P(0, 1), P(2, 1), and P(1, 0) have a negative dot polarity pattern and pixels P(0, 0), P(1, 1), and P(2, 0) have a positive dot polarity pattern. Thus, in general a pixel P(x, y) has the negative dot polarity pattern if x plus y is an odd number. Conversely, pixel P(x, y) has the positive dot polarity pattern if x plus y is an even number. However, at the next frame the pixels will switch dot polarity patterns. Thus, the MVALCD of FIG. 7(f) has a first set of pixels having of a first pixel design and a first dot polarity pattern, a second set of pixels of the first pixel design and a second dot polarity pattern, a third set of pixels of a second pixel design with a first dot polarity pattern, and a fourth set of pixels having the second pixel design and a second dot polarity pattern. Furthermore, the MVALCD of FIG. 7(f) has a first set of rows of pixels formed by alternating pixels from the first and second set of pixels and a second set of rows formed by alternating pixels from the third and fourth set of pixels. Finally, the rows are arranged by alternating rows from the first and second set of rows.

Using the principles of the present invention, one skilled in the art should realize that other pixel designs are also possible. For example, a color component could be divided into 5 color dots or more dots in the same manner as the pixel designs described above. However, because pixels should be relatively compact, using more than 6 rows of color dots in a pixel is not recommended unless the number of columns is also expanded.

FIGS. 8(a) and 8(b) show dot polarity patterns of a pixel design in accordance with another embodiments of the present invention. Specifically, each color component is divided into six color dots in two zig-zag columns. Color dots CD_1_1, CD_2_1, CD_3_1, CD_1_2, CD_2_2, and CD_3_2 form the first row of a pixel 810. Color dots CD_1_3, CD_2_3, CD_3_3, CD_1_4, CD_2_4, and CD_3_4 form a second row of pixel 810. However the second row is offset from the first row so that color dot CD_1_3 is adjacent to color dot CD_2_1. Color dots CD_1_5, CD_2_5, CD_3_5, CD_1_6, CD_2_6, and CD_3_6 form the third row of pixel 810. However the third row is aligned with the first row so that color dot CD_2_5 is adjacent to color dot CD_1_3. For pixel 810 two switching elements, such as thin film transistors, are used to drive each color component. Specifically, color dots CD_1_1, CD_1_3, and CD_1_5, which are shown with negative polarity, are driven by a first switching element while color dots CD_1_2, CD_1_4, and CD_1_6, which are shown with positive polarity, are driven by a second switching element having an opposite polarity from the first switching element. As explained above, the polarity of the color dots switch between frames. Similarly, color dots CD_2_1, CD_2_3, CD_2_5, which are shown with positive polarity, are driven by one switching element, and color dots CD_2_2, CD_2_4, CD_2_6, which are shown with negative polarity, are driven by a second switching element. Similarly, color dots CD_3_1, CD_3_3, CD_3_5, which are shown with negative polarity, are driven by one switching element, and color dots CD_3_2, CD_3_4, CD_3_6, which are shown with positive polarity, are driven by a second switching element.

Figure 8C:
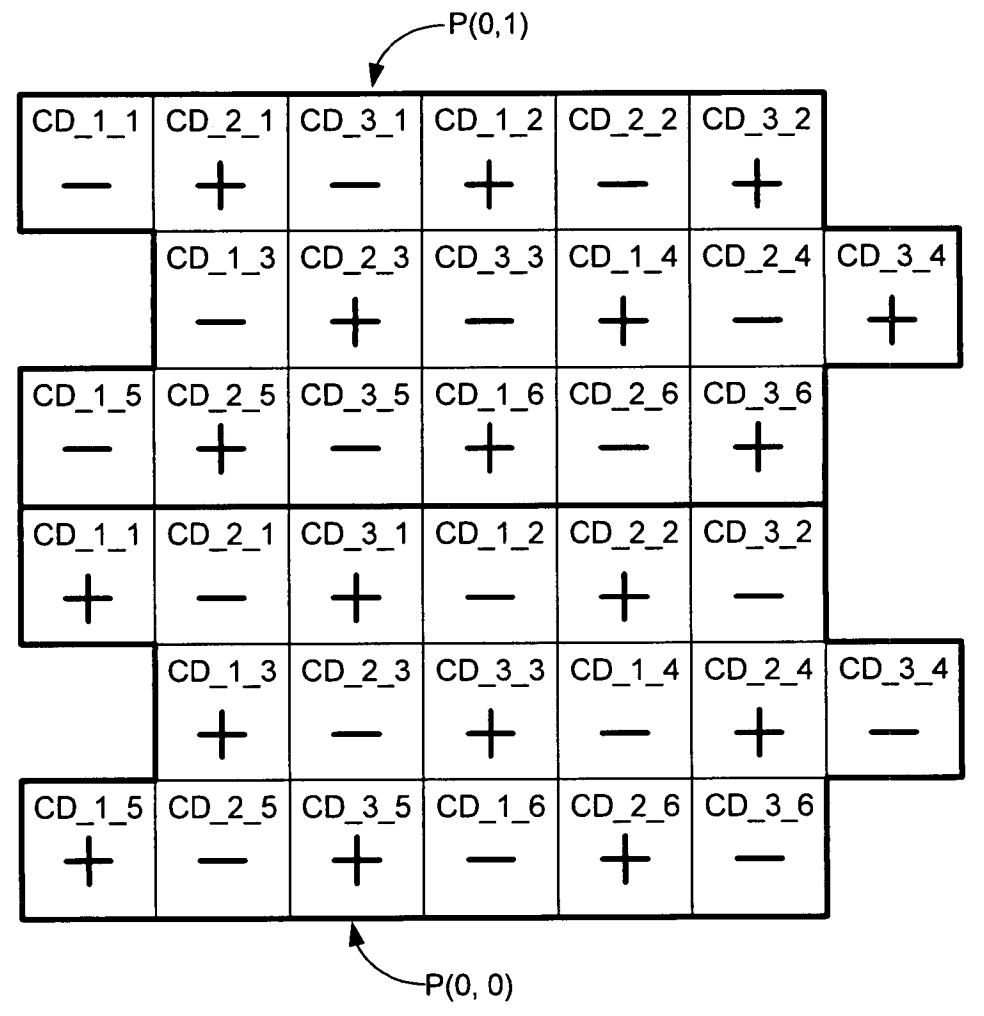
Figures 8D, 8E:
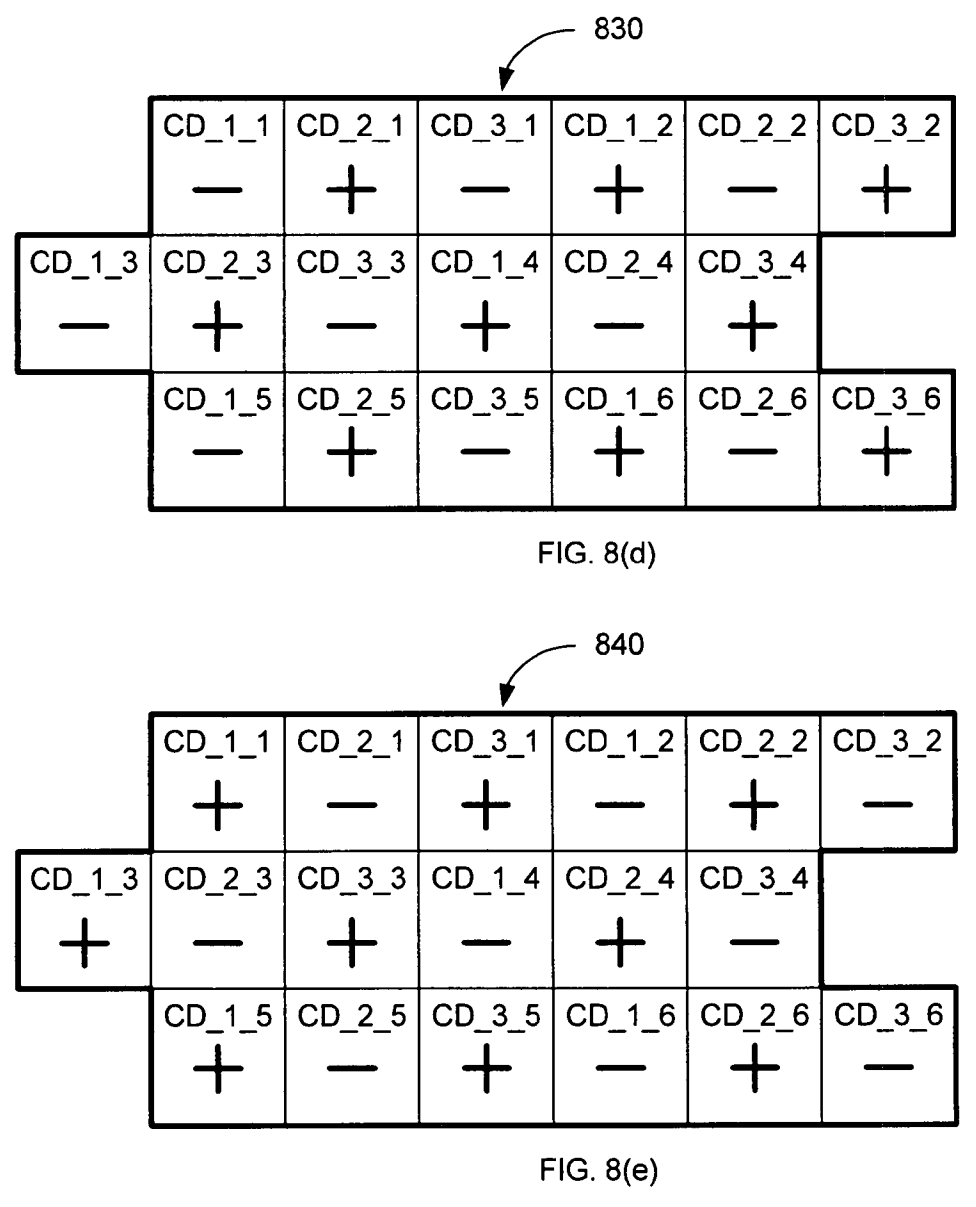

FIG. 8(*a*) illustrates the negative dot polarity pattern for the pixel design of FIGS. 8(*a*) and 8(*b*). The negative dot polarity pattern has positive polarity at even numbered color dots of the first and third color components and the odd numbered color dots of the second color component, i.e., color dots CD_1_2, CD_1_4, CD_1_6, CD_2_1, CD_2_3, CD_2_5, CD_3_2, CD_3_4, and CD_3_6. Conversely, the negative dot polarity pattern has negative polarity at the odd numbered color dots of the first and third color components and the even numbered color dots of the second color component, i.e., color dots CD_1_1, CD_1_3, CD_1_5, CD_3_1, CD_3_3, CD_3_4, CD_2_2, CD_2_4, and CD_2_6. In FIG. 8(*b*), pixel 820 is an example of the positive dot polarity pattern for the pixel design. The positive dot polarity pattern has negative polarity at even numbered color dots of the first and third color components and the odd numbered color dots of the second color component, i.e., color dots CD_1_2, CD_1_4, CD_1_6, CD_2_1, CD_2_3, CD_2_5, CD_3_2, CD_3_4, and CD_3_6. Conversely, the positive dot polarity pattern has positive polarity at the odd numbered color dots of the first and third color components and the even numbered color dots of the second color component, i.e., color dots CD_1_1, CD_1_3, CD_1_5, CD_3_1, CD_3_3, CD_3_4, CD_2_2, CD_2_4, and CD_2_6.

Pixels using the pixel design of FIGS. 8(*a*) and 8(*b*) should be arranged in an alternating row pattern so that pixels in even numbered rows have one dot polarity pattern and pixels in odd numbered rows have the other dot polarity pattern. In general a pixel P(x, y) has the first dot polarity pattern if y is an odd number. Conversely, pixel P(x, y) has the second dot polarity pattern if y an even number. FIG. 8(*c*) illustrates this pattern with a pixel P(0, 0) in a first row having the positive dot polarity and a pixel P(0, 1) in the next row having a negative dot polarity pattern. However, at the next frame the pixels will switch dot polarity patterns.

As illustrated in FIG. 8(*c*), the alternating row pattern results in an asymmetric color distribution. For example, color dot CD_1_5 of pixel P(0, 1) is adjacent to color dot CD_1_1 of pixel P(0, 0). Thus, some embodiment of the present invention also use a second pixel design with the pixel designs of FIGS. 8(*a*) and 8(*b*). Specifically, FIGS. 8(*d*) and 8(*e*) show dot polarity patterns of a pixel design in accordance with another embodiments of the present invention. Specifically, each color component is divided into six color dots in two zig-zag columns. Color dots CD_1_1, CD_2_1, CD_3_1, CD_1_2, CD_2_2, and CD_3_2 form the first row of a pixel 830. Color dots CD_1_3, CD_2_3, CD_3_3, CD_1_4, CD_2_4, and CD_3_4 form a second row of pixel 830. However the second row is offset from the first row so that color dot CD_2_3 is adjacent to color dot CD_1_1. Color dots CD_1_5, CD_2_5, CD_3_5, CD_1_6, CD_2_6, and CD_3_6 form the third row of pixel 830. However the third row is aligned with the first row so that color dot CD_1_5 is adjacent to color dot CD_2_3. For pixel 830 two switching elements, such as thin film transistors, are used to drive each color component. Specifically, color dots CD_1_1, CD_1_3, and CD_1_5, which are shown with negative polarity, are driven by a first switching element while color dots CD_1_2, CD_1_4, and CD_1_6, which are shown with positive polarity, are driven by a second switching element having an opposite polarity from the first switching element. As explained above, the polarity of the color dots switch between frames. Similarly, color dots CD_2_1, CD_2_3, CD_2_5, which are shown with positive polarity, are driven by one switching element, and color dots CD_2_2, CD_2_4, CD_2_6, which are shown with negative polarity, are driven by a second switching element. Similarly, color dots CD_3_1, CD_3_3, CD_3_5, which are shown with negative polarity, are driven by one switching element, and color dots CD_3_2, CD_3_4, CD_3_6, which are shown with positive polarity, are driven by a second switching element.

FIG. 8(*d*) illustrates the negative dot polarity pattern for the pixel design of FIGS. 8(*d*) and 8(*e*). The negative dot polarity pattern has positive polarity at even numbered color dots of the first and third color components and the odd numbered color dots of the second color component, i.e., color dots CD_1_2, CD_1_4, CD_1_6, CD_2_1, CD_2_3, CD_2_5, CD_3_2, CD_3_4, and CD_3_6. Conversely, the negative dot polarity pattern has negative polarity at the odd numbered color dots of the first and third color components and the even numbered color dots of the second color component, i.e., color dots CD_1_1, CD_1_3, CD_1_5, CD_3_1, CD_3_3, CD_3_4, CD_2_2, CD_2_4, and CD_2_6. In FIG. 8(*e*), pixel 840 is an example of the positive dot polarity pattern for the pixel design. The positive dot polarity pattern has negative polarity at even numbered color dots of the first and third color components and the odd numbered color dots of the second color component, i.e., color dots CD_1_2, CD_1_4, CD_1_6, CD_2_1, CD_2_3, CD_2_5, CD_3_2, CD_3_4, and CD_3_6. Conversely, the positive dot polarity pattern has positive polarity at the odd numbered color dots of the first and third color components and the even numbered color dots of the second color component, i.e., color dots CD_1_1, CD_1_3, CD_1_5, CD_3_1, CD_3_3, CD_3_4, CD_2_2, CD_2_4, and CD_2_6.

Pixels using the pixel design of FIGS. 8(*a*) and 8(*b*) with the pixel design of FIGS. 8(*d*) and 8(*e*) should be arranged in an alternating row pattern so that pixels in even numbered rows are of one pixel design and odd numbered rows are of the second pixel design. FIG. 8(*f*) illustrates this pattern with a pixel P(0, 0) of the pixel design of FIGS. 8(*d*) and 8(*e*) in a first row and a pixel P(0, 1) of the pixel design of FIGS. 8(*a*) and 8(*b*) in the next row. All pixels would have the same dot polarity patterns in a given frame. For example, in FIG. 8(*f*) both pixels have negative dot polarity patterns. However, at the next frame the pixels will switch to positive dot polarity patterns. Thus, in general a pixel P(x, y) is of a first pixel design y is an odd number. Conversely, pixel P(x, y) has a second pixel design if y an even number.

Figure 8F:
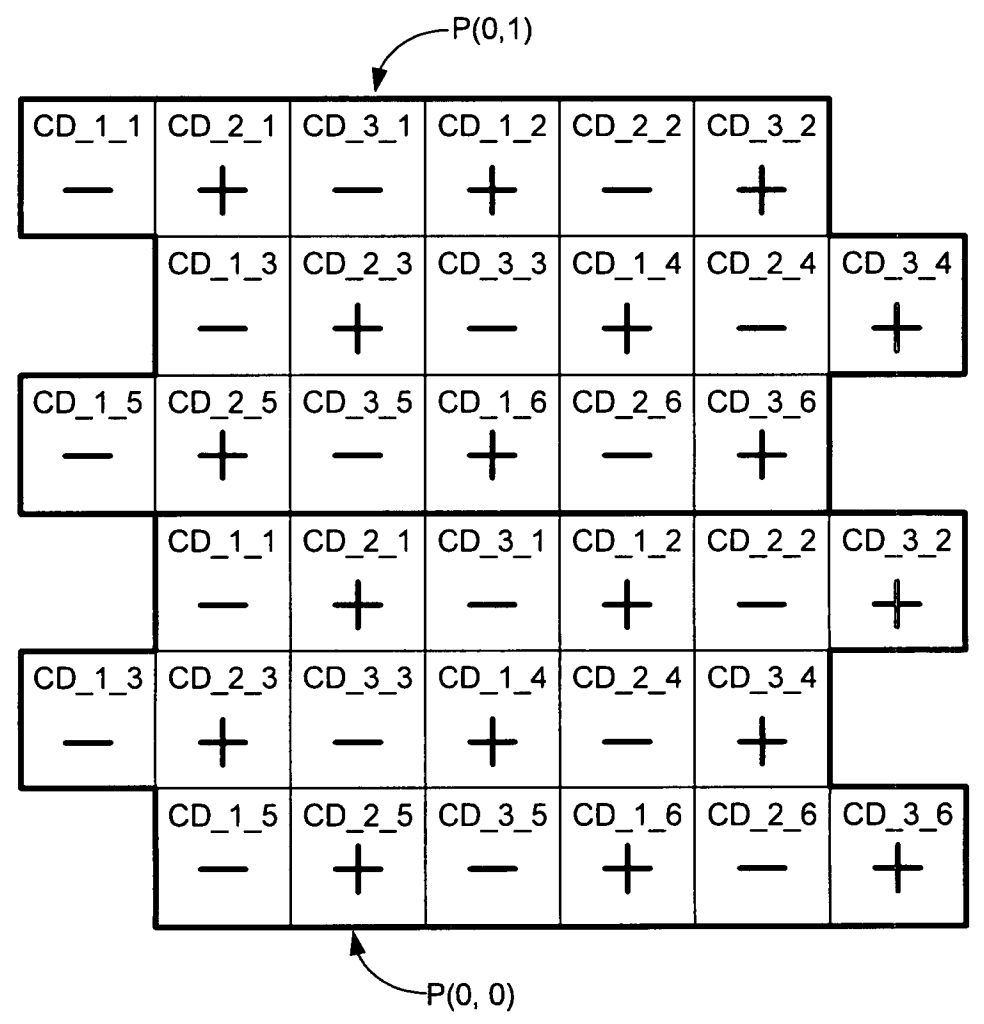

While the pixel pattern of FIG. 8(f) has better color distribution than the pixel pattern of FIG. 8(c). Some embodiments of the present invention may still use the pixel pattern of FIG. 8(c) because the pixel pattern in FIG. 8(c) can have a more uniform electrical distribution than the pixel pattern of FIG. 8(f). A more uniform electrical distribution may improve optical performance by reducing flicker and cross-talk.

Some embodiments of the present invention, particularly those used for very large screens, include four color components. For most application the four color components would be red, green, blue, and white to improve the brightness and contrast of the display unit. However, for some applications the fourth color component could be a repeat of one of the other three color components. For example, in many military applications, the four color components could be red, green one, blue and green two. FIGS. 9(a)-9(b) show dot polarity patterns of a pixel design in accordance with another embodiments of the present invention. Specifically, in FIG. 9(a) each of the four color components of pixel 910 is divided into 4 color dots. Color dots CD_1_1 (i.e., the first color dot of color component 1), CD_2_1 (i.e., the first color dot of the second color component), CD_3_1 (i.e., the first color dot of the third color component) and CD_4_1 (i.e., the first color dot of the fourth color component) form the first row of pixel 910. Color dots CD_1_2, CD_2_2, CD_3_2 and CD_4_2 form a second row of pixel 910. However the second row is offset from the first row so that color dot CD_1_2 is adjacent to color dot CD_2_1. Color dots CD_1_3, CD_2_3, CD_3_3, and CD_4_3 form the third row of pixel 910. However the third row is aligned with the first row so that color dot CD_2_3 is adjacent to color dot CD_1_2. Finally, color dots CD_1_4, CD_2_4, CD_3_4, and CD_4_4 form the fourth row of pixel 910. However, the fourth row is aligned with the second row so that color dot CD_1_4 is adjacent to color dot CD_2_3.

FIG. 9(a) illustrates a negative dot polarity pattern for pixel 910. The negative dot polarity pattern has positive polarity at the second color component and fourth color component, i.e., color dots CD_2_1, CD_2_2, CD_2_3, CD_2_4, CD_4_1, CD_4_2, CD_4_3, and CD_4_4, and negative polarity at the first and third color components, i.e., CD_1_1, CD_1_2, CD_1_3, CD_1_4, CD_3_1, CD_3_2, CD_3_3, CD_3_4. In FIG. 9(b), pixel 920 is an example of the positive dot polarity pattern, which has negative polarity at the second color component and fourth color component, i.e., color dots CD_2_1, CD_2_2, CD_2_3, CD_2_4, CD_4_1, CD_4_2, CD_4_3, and CD_4_4, and positive polarity at the first and third color components, i.e., color dots CD_1_1, CD_1_2, CD_1_3, CD_1_4, CD_3_1, CD_3_2, CD_3_3, and CD_3_4.

Figure 9C:
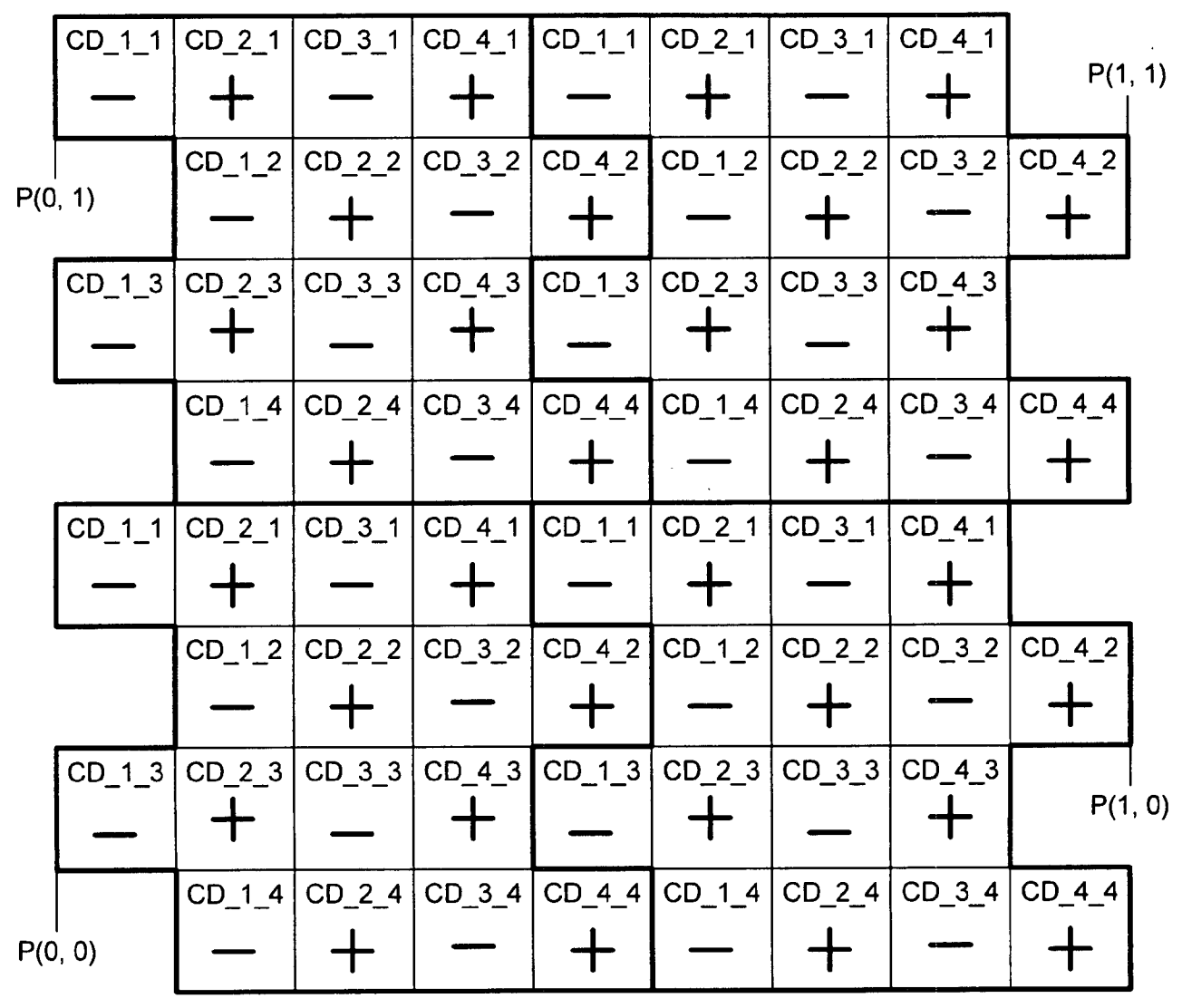

Displays using the pixel design of FIGS. 9(a) and 9(b) should use the same dot polarity pattern for all pixels in a display frame to create a checkerboard pattern for all the color dots of the display. However, as explained above, successive display frames should switch between the two dot polarity patterns. For example, as illustrated in FIG. 9(c) Pixels P(0, 0), P(0, 1), P(1, 0), and P(1, 1) all have the negative dot polarity pattern. However in the next frame the pixels would switch to the positive dot polarity pattern.

Figures 9D, 9E:
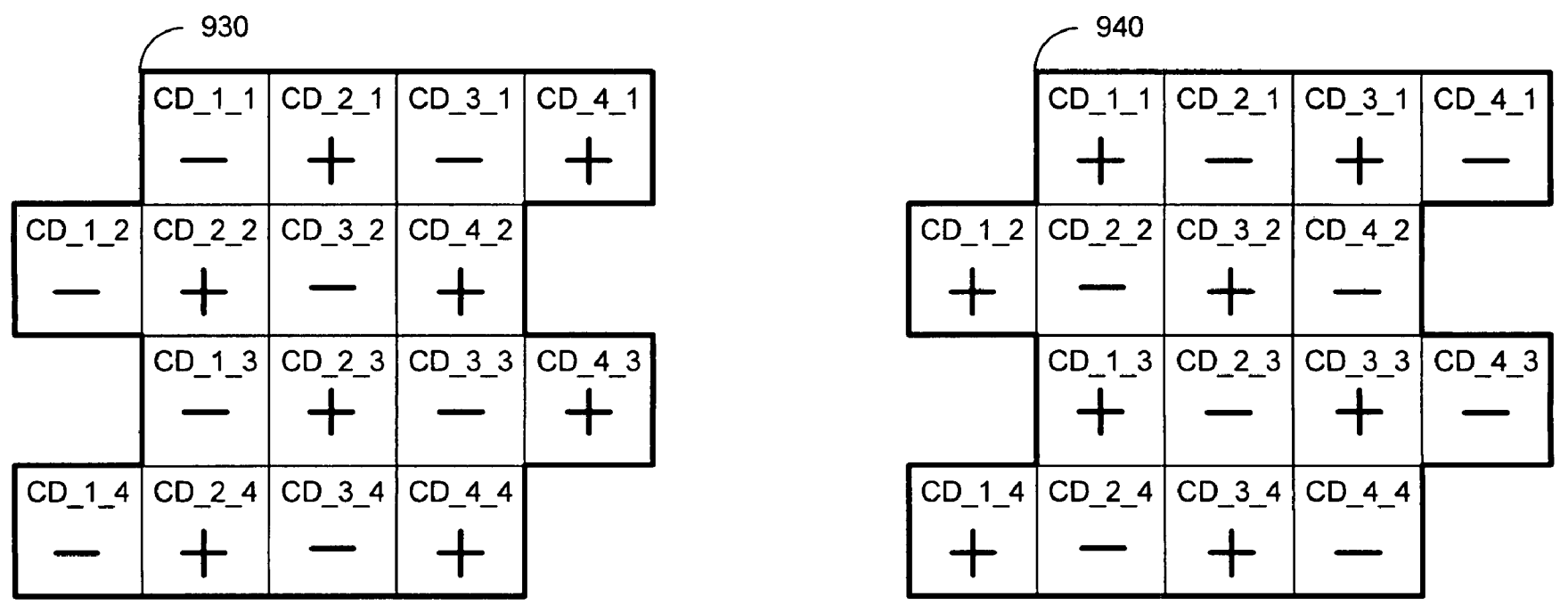

In some embodiments of the present invention, using pixels of different dot polarity patterns may provide more uniform electrical distribution. Therefore, some embodiments of the present invention use a second pixel design with the pixel design of FIGS. 9(a) and 9(b). FIGS. 9(d)-9(e) show dot polarity patterns of a pixel design in accordance with another embodiments of the present invention. Specifically, in FIG. 9(d) each of the four color components of pixel 930 is divided into 4 color dots. Color dots CD_1_1 (i.e., the first color dot of color component 1), CD_2_1 (i.e., the first color dot of the second color component), CD_3_1 (i.e., the first color dot of the third color component) and CD_4_1 (i.e., the first color dot of the fourth color component) form the first row of pixel 910. Color dots CD_1_2, CD_2_2, CD_3_2 and CD_4_2 form a second row of pixel 930. However the second row is offset from the first row so that color dot CD_2_2 is adjacent to color dot CD_1_1. Color dots CD_1_3, CD_2_3, CD_3_3, and CD_4_3 form the third row of pixel 930. However the third row is aligned with the first row so that color dot CD_1_3 is adjacent to color dot CD_2_2. Finally, color dots CD_1_4, CD_2_4, CD_3_4, and CD_4_4 form the fourth row of pixel 930. However, the fourth row is aligned with the second row so that color dot CD_2_4 is adjacent to color dot CD_1_3.

FIG. 9(d) illustrates the negative dot polarity pattern for pixel 930. The negative dot polarity pattern has positive polarity at the second color component and fourth color component, i.e., color dots CD_2_1, CD_2_2, CD_2_3, CD_2_4, CD_4_1, CD_4_2, CD_4_3, and CD_4_4, and negative polarity at the first and third color components, i.e., CD_1_1, CD_1_2, CD_1_3, CD_1_4, CD_3_1, CD_3_2, CD_3_3, CD_3_4. In FIG. 9(e), pixel 940 is an example of the positive dot polarity pattern, which has negative polarity at the second color component and fourth color component, i.e., color dots CD_2_1, CD_2_2, CD_2_3, CD_2_4, CD_4_1, CD_4_2, CD_4_3, and CD_4_4, and positive polarity at the first and third color components, i.e., color dots CD_1_1, CD_1_2, CD_1_3, CD_1_4, CD_3_1, CD_3_2, CD_3_3, and CD_3_4.

Figure 9F:
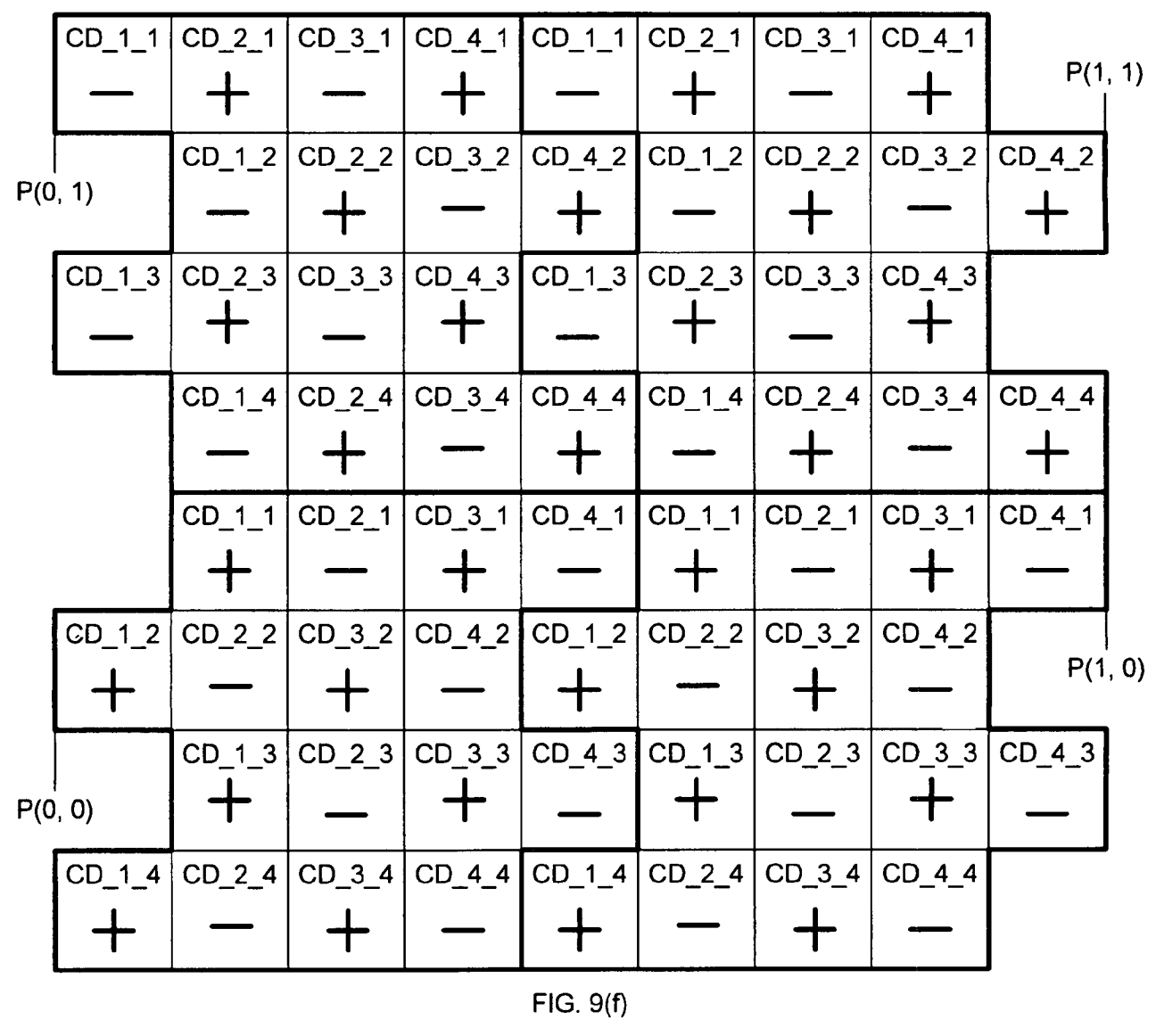

Displays using the pixel design of FIGS. 9(a) and 9(b) (i.e., the first pixel design) with the pixel design of FIGS. 9(d) and 9(e) (i.e. the second pixel design) are arranged in alternating rows of different pixel designs. Within each row the pixels are all of the same dot polarity patterns. However each alternating row should have different dot polarity patterns. FIG. 9(f) illustrates this pattern. Specifically, in FIG. 9(f), a first row of pixels illustrated by pixels P(1, 0) and P(1, 1) use the pixel design of FIGS. 9(a) and 9(b). Both pixels P(1, 0) and P(1, 1) are illustrated using a negative dot polarity pattern. However, as explained above, successive display frames should switch between the positive and negative dot polarity patterns. A second row of pixels illustrated by pixels P(0, 0) and P(1, 0) use the pixel design from FIGS. 9(d) and 9(e) and are of opposite dot polarity from pixels P(0, 1) and P(1, 1). As compared to the pixel pattern of FIG. 9(c), the pixel pattern of FIG. 9(f) can have a more uniform electrical distribution, which may improve optical performance by reducing flicker and cross-talk.

FIGS. 10(a)-10(b) show dot polarity patterns of a pixel design with four color components in accordance with another embodiments of the present invention. Specifically, in FIG. 10(a) each of the four color components of pixel 1010 is divided into 4 color dots. Color dots CD_1_1 (i.e., the first color dot of color component 1), CD_2_1 (i.e., the first color dot of the second color component), CD_3_1 (i.e., the first color dot of the third color component) and CD_4_1 (i.e., the first color dot of the fourth color component) form the first row of pixel 1010. Color dots CD_4_2, CD_1_2, CD_2_2, and CD_3_2 form a second row of pixel 1010, with color dot CD_4_2 being adjacent to color dot CD_1_1. Color dots CD_1_3, CD_2_3, CD_3_3, and CD_4_3 form the third row of pixel 1010, with color dot CD_1_3 being adjacent to color dot CD_4_2. Finally, color dots CD_4_4, CD_1_4, CD_2_4, and CD_3_4, form the fourth row of pixel 1010, with color dot CD_4_4 being adjacent to color dot CD_1_3.

FIG. 10(a) illustrates the negative dot polarity pattern for pixel 1010. The negative dot polarity pattern has positive polarity at the second color component and fourth color component, i.e., color dots CD_2_1, CD_2_2, CD_2_3, CD_2_4, CD_4_1, CD_4_2, CD_4_3, and CD_4_4, and negative polarity at the first and third color components, i.e., CD_1_1, CD_1_2, CD_1_3, CD_1_4, CD_3_1, CD_3_2, CD_3_3, CD_3_4. In FIG. 10(b), pixel 1020 is an example of the positive dot polarity pattern, which has negative polarity at the second color component and fourth color component, i.e., color dots CD_2_1, CD_2_2, CD_2_3, CD_2_4, CD_4_1, CD_4_2, CD_4_3, and CD_4_4, and positive polarity at the first and third color components, i.e., color dots CD_1_1, CD_1_2, CD_1_3, CD_1_4, CD_3_1, CD_3_2, CD_3_3, and CD_3_4.

Displays using the pixel design of FIGS. 10(a) and 10(b) should use the same dot polarity pattern for all pixels in a display frame to create a checkerboard pattern for all the color dots of the display. However, as explained above, successive display frames should switch between the two dot polarity patterns.

FIGS. 11(a)-11(b) show dot polarity patterns of a pixel design with four color components in accordance with another embodiments of the present invention. Specifically, in FIG. 11(a) each of the four color components of pixel 1110 is divided into 4 color dots. Color dots CD_1_1 (i.e., the first color dot of color component 1), CD_2_1 (i.e., the first color dot of the second color component), CD_1_2 (i.e., the second color dot of the first color component) and CD_2_2 (i.e., the second color dot of the second color component) form the first row of pixel 1110. Color dots CD_4_1, CD_3_1, CD_4_2, and CD_3_2 form a second row of pixel 1010, with color dot CD_4_1 being adjacent to color dot CD_1_1. Color dots CD_1_3, CD_2_3, CD_1_4, and CD_2_4 form the third row of pixel 1110, with color dot CD_1_3 being adjacent to color dot CD_4_1. Finally, color dots CD_4_3, CD_3_3, CD_4_4, and CD_3_4, form the fourth row of pixel 1010, with color dot CD_4_3 being adjacent to color dot CD_1_3.

FIG. 11(a) illustrates a negative dot polarity pattern for pixel 1110. The negative dot polarity pattern has positive polarity at the second color component and fourth color component, i.e., color dots CD_2_1, CD_2_2, CD_2_3, CD_2_4, CD_4_1, CD_4_2, CD_4_3, and CD_4_4, and negative polarity at the first and third color components, i.e., CD_1_1, CD_1_2, CD_1_3, CD_1_4, CD_3_1, CD_3_2, CD_3_3, CD_3_4. In FIG. 11(b), pixel 1120 is an example of the second dot polarity pattern, which has negative polarity at the second color component and fourth color component, i.e., color dots CD_2_1, CD_2_2, CD_2_3, CD_2_4, CD_4_1, CD_4_2, CD_4_3, and CD_4_4, and positive polarity at the first and third color components, i.e., color dots CD_1_1, CD_1_2, CD_1_3, CD_1_4, CD_3_1, CD_3_2, CD_3_3, and CD_3_4.

Displays using the pixel design of FIGS. 11(a) and 11(b) should use the same dot polarity pattern for all pixels in a display frame to create a checkerboard pattern for all the color dots of the display. However, as explained above, successive display frames should switch between the two dot polarity patterns.

FIGS. 12(a)-12(b) show dot polarity patterns of a pixel design in accordance with another embodiments of the present invention. Specifically, in FIG. 12(a) each of the four color components of pixel 1210 is divided into 3 color dots. Color dots CD_1_1 (i.e., the first color dot of color component 1), CD_2_1 (i.e., the first color dot of the second color component), CD_3_1 (i.e., the first color dot of the third color component) and CD_4_1 (i.e., the first color dot of the fourth color component) form the first row of pixel 1210. Color dots CD_1_2, CD_2_2, CD_3_2 and CD_4_2 form a second row of pixel 1210. However the second row is offset from the first row so that color dot CD_1_2 is adjacent to color dot CD_2_1. Color dots CD_1_3, CD_2_3, CD_3_3, and CD_4_3 form the third row of pixel 1210. However the third row is aligned with the first row so that color dot CD_2_3 is adjacent to color dot CD_1_2.

FIG. 12(a) illustrates a negative dot polarity pattern for pixel 1210. The negative dot polarity pattern has positive polarity at the second color component and fourth color component, i.e., color dots CD_2_1, CD_2_2, CD_2_3, CD_2_4, CD_4_1, CD_4_2, CD_4_3, and CD_4_4, and negative polarity at the first and third color components, i.e., CD_1_1, CD_1_2, CD_1_3, CD_1_4, CD_3_1, CD_3_2, CD_3_3, CD_3_4. In FIG. 12(b), pixel 1220 is an example of the positive dot polarity pattern, which has negative polarity at the second color component and fourth color component, i.e., color dots CD_2_1, CD_2_2, CD_2_3, CD_2_4, CD_4_1, CD_4_2, CD_4_3, and CD_4_4, and positive polarity at the first and third color components, i.e., color dots CD_1_1, CD_1_2, CD_1_3, CD_1_4, CD_3_1, CD_3_2, CD_3_3, and CD_3_4.

Figure 12C:
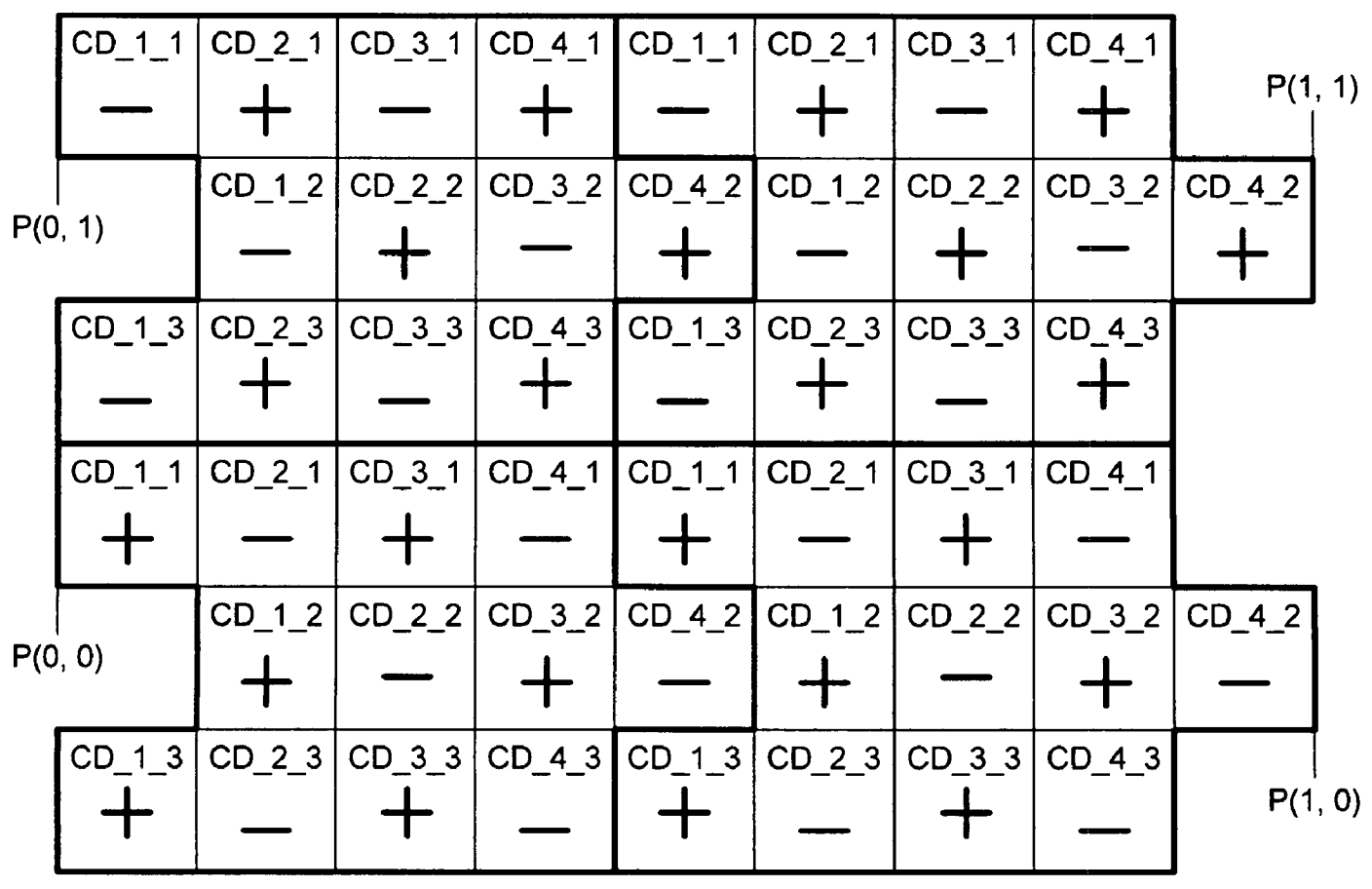

Displays using the pixel design of FIGS. 12(a) and 12(b) should arrange the pixels in alternating rows of different dot polarity patterns. Specifically, even rows should include pixels of a first dot polarity pattern and odd rows should include pixels of the second dot polarity pattern. However, as explained above, successive display frames should switch between the two dot polarity patterns. This pattern is illustrated in FIG. 12(c), in which a first row of pixels represented by pixels P(0, 1) and pixel P(1, 1) are of the negative polarity type. However, Pixels P(0, 0) and P(1, 0), which represent a second row are of the positive polarity type. Thus, in general, a pixel P(x, y) would have a first polarity type if y is an even number and would have a second polarity type if y is an odd number.

However, the display of FIG. 12(c) has an asymmetric color distribution at the boundary of adjacent rows. Therefore, some embodiments of the present invention incorporate a second pixel design with the pixel design of FIGS. 12(a) and 12(b). FIGS. 12(d)-12(e) show dot polarity patterns of a pixel design in accordance with another embodiments of the present invention. Specifically, in FIG. 12(d) each of the four color components of pixel 1230 is divided into 3 color dots. Color dots CD_1_1 (i.e., the first color dot of color component 1), CD_2_1 (i.e., the first color dot of the second color component), CD_3_1 (i.e., the first color dot of the third color component) and CD_4_1 (i.e., the first color dot of the fourth color component) form the first row of pixel 910. Color dots CD_1_2, CD_2_2, CD_3_2 and CD_4_2 form a second row of pixel 1230. However the second row is offset from the first row so that color dot CD_2_2 is adjacent to color dot CD_1_1. Color dots CD_1_3, CD_2_3, CD_3_3, and CD_4_3 form the third row of pixel 1230. However the third row is aligned with the first row so that color dot CD_1_3 is adjacent to color dot CD_2_2.

FIG. 12(d) illustrates the negative dot polarity pattern for pixel 1230. The negative dot polarity pattern has positive polarity at the second color component and fourth color component, i.e., color dots CD_2_1, CD_2_2, CD_2_3, CD_2_4, CD_4_1, CD_4_2, CD_4_3, and CD_4_4, and negative polarity at the first and third color components, i.e., CD_1_1, CD_1_2, CD_1_3, CD_1_4, CD_3_1, CD_3_2, CD_3_3, CD_3_4. In FIG. 12(e), pixel 1240 is an example of the positive dot polarity pattern, which has negative polarity at the second color component and fourth color component, i.e., color dots CD_2_1, CD_2_2, CD_2_3, CD_2_4, CD_4_1, CD_4_2, CD_4_3, and CD_4_4, and positive polarity at the first and third color components, i.e., color dots CD_1_1, CD_1_2, CD_1_3, CD_1_4, CD_3_1, CD_3_2, CD_3_3, and CD_3_4.

Figure 12F:
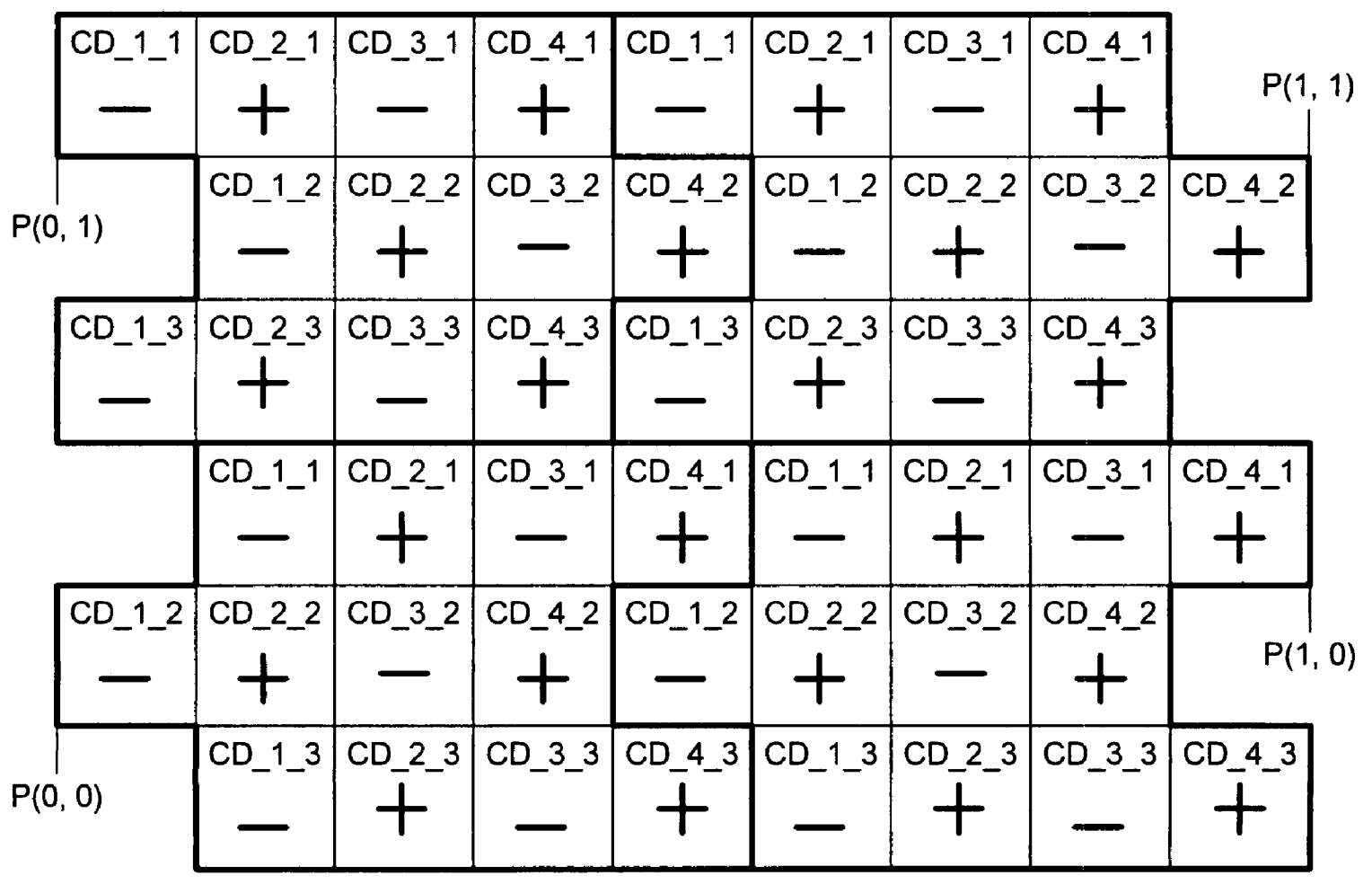

Displays using the pixel design of FIGS. 12(a) and 12(b) (i.e., the first pixel design) with the pixel design of FIGS. 12(d) and 12(e) (i.e. the second pixel design) are arranged in alternating rows of different pixel designs. Within each row the pixels are all of the same dot polarity patterns. FIG. 12(f) illustrates this pattern. Specifically, in FIG. 12(f), a first row of pixels illustrated by pixels P(1, 0) and P(1, 1) use the pixel design of FIGS. 12(a) and 12(b). Both pixels P(1, 0) and P(1, 1) are illustrated using a negative dot polarity pattern. However, as explained above, successive display frames should switch between the positive and negative dot polarity patterns. A second row of pixels illustrated by pixels P(0, 0) and P(1, 0) use the pixel design from FIGS. 12(d) and 12(e) and are also of the negative dot polarity pattern.

While the pixel pattern of FIG. 9(f) provides better color distribution than the pixel pattern of FIG. 9 (c), some embodiments of the present invention may still use the pixel pattern of FIG. 9(c) because the pixel pattern in FIG. 9(c) can have a more uniform electrical distribution than the pixel pattern of FIG. 9(f). A more uniform electrical distribution may improve optical performance by reducing flicker and cross-talk.

Even though, MVALCDs in accordance with the present invention provide wide viewing angle at a low cost, some embodiments of the present invention use optical compensation methods to further increase the viewing angle. For example, some embodiments of the present invention use negative birefringence optical compensation films with vertical oriented optical axis on both the top and bottom substrate to increase viewing angle. Other embodiments may use uniaxial films.

In the various embodiments of the present invention, novel structures and methods have been described for creating a multi-domain vertical alignment liquid crystal display without the use of physical features on the substrate. The various embodiments of the structures and methods of this invention that are described above are illustrative only of the principles of this invention and are not intended to limit the scope of the invention to the particular embodiments described. For example, in view of this disclosure those skilled in the art can define other pixel definitions, dot polarity patterns, pixel designs, polarities, fringe fields, electrodes, substrates, films, and so forth, and use these alternative features to create a method, or system according to the principles of this invention. Thus, the invention is limited only by the following claims.

What is claimed is:

1. A display unit comprising:
   a plurality of odd numbered rows of pixels, wherein the pixels on the odd numbered rows are of a first pixel design and alternate between a first dot polarity pattern of the first pixel design and a second dot polarity pattern of the first pixel design; and
   a plurality of even numbered rows of pixels;
   wherein a first pixel of the display unit using the first pixel design further comprises:
      a first first-pixel color dot;
      a second first-pixel color dot; and
      a first first-pixel switching element controlling the first first-pixel color dot and the second first-pixel color dot;
   wherein the pixels on the even rows are of the first pixel design and alternate between the first dot polarity pattern of the first pixel design and the second dot polarity pattern of the first pixel design; and
   wherein a first pixel on odd numbered rows is of the first dot polarity pattern of the first pixel design and a first pixel on even numbered rows is of the first dot polarity pattern of the first pixel design.

2. The display unit of claim 1, wherein a first pixel on odd numbered rows is of the first dot polarity pattern of the first pixel design and a first pixel on even numbered rows is of the second dot polarity pattern of the first pixel design.

3. A display unit comprising:
   a plurality of odd numbered rows of pixels, wherein the pixels on the odd numbered rows are of a first pixel design and alternate between a first dot polarity pattern of the first pixel design and a second dot polarity pattern of the first pixel design; and
   a plurality of even numbered rows of pixels, wherein the pixels on the even rows are of a second pixel design and alternate between the first dot polarity pattern of the second pixel design and the second dot polarity pattern of the second pixel design.

4. The display unit of claim 3, wherein a first pixel on odd numbered rows is of the first dot polarity pattern of the first pixel design and a first pixel on even numbered rows is of the first dot polarity pattern of the second pixel design.

5. The display unit of claim 3, wherein a first pixel on odd numbered rows is of the first dot polarity pattern of the first pixel design and a first pixel on even numbered rows is of the second dot polarity pattern of the second pixel design.

6. A display unit comprising:
   a plurality of odd numbered rows of pixels, wherein the pixels on the odd numbered rows are of a first pixel design and alternate between a first dot polarity pattern of the first pixel design and a second dot polarity pattern of the first pixel design; and
   a plurality of even numbered rows of pixels;
   wherein a first pixel of the display unit using the first pixel design further comprises:
      a first first-pixel color dot;
      a second first-pixel color dot; and
      a first first-pixel switching element controlling the first first-pixel color dot and the second first-pixel color dot; and
   wherein the first pixel of the display unit further comprises:
      a first plurality of color dots having a first dot polarity;
      a second plurality of color dots having a second dot polarity; and wherein the first plurality of color dots and the second plurality of color dots form a checkerboard pattern.

7. The display unit of claim 6, wherein the first plurality of color dots are color dots of a first color component and a third color component and the second plurality of color dots are color dots of a second color component.

8. The display of claim 7, wherein the first first-pixel color dot and the second first-pixel color dot are part of the first color component.

9. A display unit comprising:
   a plurality of odd numbered rows of pixels, wherein the pixels on the odd numbered rows are of a first pixel design and alternate between a first dot polarity pattern of the first pixel design and a second dot polarity pattern of the first pixel design; and
   a plurality of even numbered rows of pixels;
   wherein a first pixel of the display unit using the first pixel design comprises:
      a first plurality of color dots having a first dot polarity;

a second plurality of color dots having a second dot polarity; and wherein the first plurality of color dots and the second plurality of color dots form a checkerboard pattern, wherein the first plurality of color dots are color dots of a first color component and a third color component and the second plurality of color dots are color dots of a second color component; and wherein color dots of the first color components are controlled by a single switching device.

10. The display unit of claim 9, wherein the switching device is a thin film transistor.

11. A display unit comprising:
a plurality of odd numbered rows of pixels, wherein the pixels on the odd numbered rows are of a first pixel design and alternate between a first dot polarity pattern of the first pixel design and a second dot polarity pattern of the first pixel design; and
a plurality of even numbered rows of pixels;
wherein a first pixel of the display unit comprises:
a first row having a first color dot from a first color component, a second color dot from a second color component, and a third color dot from a third color component; and
a second row having a first color dot from the first color component, a second color dot from the second color component, and a third color dot from the third color component, wherein the second row is offset from the first row so that the first color dot of the second row is adjacent to the second color dot of the first row.

12. The display unit of claim 11 further comprising a third row having a first color dot from the first color component, a second color dot from the second color component, and a third color dot from the third color component, wherein the third row is offset from the second row so that the first color dot of the second row is adjacent to the second color dot of the third row.

13. The display unit of claim 11, further comprising a first-color switching device coupled to drive all color dots from the first color component.

14. The display unit of 13, further comprising:
a second-color switching coupled to drive all color dots from the second color component; and
a third-color switching device coupled to drive all the color dots from the third color component.

15. The display unit of claim 11, wherein:
the first row further comprises a fourth color dot from a fourth color component; and
the second row further comprises a fourth color the fourth color component.

16. A display unit comprising:
a plurality of odd numbered rows of pixels, wherein the pixels on the odd numbered rows are of a first pixel design and alternate between a first dot polarity pattern of the first pixel design and a second dot polarity pattern of the first pixel design; and
a plurality of even numbered rows of pixels;
wherein a first pixel of the display unit using the first pixel design further comprises:
a first first-pixel color dot;
a second first-pixel color dot;
a third first-pixel color dot;
a fourth first-pixel color dot;
a first first-pixel switching element controlling the first first-pixel color dot and the second first-pixel color dot; and
a second first-pixel switching element controlling the third first-pixel color dot and the fourth first-pixel color dot.

17. The display of claim 16, wherein the first first-pixel color dot and the second first-pixel color dot belong to a first color component.

18. The display of claim 17, wherein the third first-pixel color dot and the fourth first-pixel color dot belong to a second color component.

* * * * *